(12) United States Patent
Conway

(10) Patent No.: US 11,593,758 B2
(45) Date of Patent: *Feb. 28, 2023

(54) BULK FOOD STORAGE AND DISPENSING SYSTEM WITH AUTOMATIC LABEL CREATION

(71) Applicant: SmartBins Inc., Capitola, CA (US)

(72) Inventor: David Conway, Capitola, CA (US)

(73) Assignee: SMARTBINS INC., Capitola, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/676,970

(22) Filed: Feb. 22, 2022

(65) Prior Publication Data
US 2022/0172158 A1    Jun. 2, 2022

Related U.S. Application Data

(63) Continuation of application No. 16/585,029, filed on Sep. 27, 2019, now Pat. No. 11,288,626, which is a
(Continued)

(51) Int. Cl.
*A47F 1/03* (2006.01)
*G06Q 10/087* (2023.01)
(Continued)

(52) U.S. Cl.
CPC ............. *G06Q 10/087* (2013.01); *A47F 1/03* (2013.01); *B65G 1/02* (2013.01); *G01G 19/4144* (2013.01);
(Continued)

(58) Field of Classification Search
CPC .... G06Q 10/087; G01G 19/4144; A47F 1/03; A47F 1/035; G07F 11/44
See application file for complete search history.

(56) References Cited

U.S. PATENT DOCUMENTS

| 4,108,363 | A | * | 8/1978 | Susumu | G07F 9/105 177/25.14 |
| 4,718,578 | A |   | 1/1988 | Radek |   |
| 5,437,393 | A |   | 8/1995 | Blicher |   |
| 6,241,123 | B1 |  | 6/2001 | Elmore |   |
| 6,504,481 | B2 | * | 1/2003 | Teller | G06Q 50/12 222/23 |

(Continued)

OTHER PUBLICATIONS

David Conway, Presentation at Expo West, Aug. 26, 2019, https://www.youtube.com/watch?v=g-MsLW8cDWg&feature=youtu.be.

*Primary Examiner* — Timothy R Waggoner
(74) *Attorney, Agent, or Firm* — Lempia Summerfield Katz LLC

(57) ABSTRACT

Systems are disclosed for dispensing, weighing, identifying, processing, and/or printing tag identifiers for items (e.g., bulk food items). In one embodiment, a storage system includes a scoop bin configured to store a product, wherein the scoop bin has a lid configured to be moved between a closed position and an open position, and wherein the product is configured to be scooped out of the scoop bin by a customer when the lid is in the open position. The system further includes a sensor configured to monitor a movement of the scoop bin, wherein the sensor is configured to transmit a notification to the computing device identifying the movement of the scoop bin. A printer is configured to receive an instruction from the computing device to automatically print a label identifying the product stored in the scoop bin following the computing device receiving the notification of the movement.

18 Claims, 22 Drawing Sheets

Related U.S. Application Data continuation-in-part of application No. 15/423,197, filed on Feb. 2, 2017, now Pat. No. 10,665,051.

(60) Provisional application No. 62/738,247, filed on Sep. 28, 2018.

(51) Int. Cl.
*G01N 35/00* (2006.01)
*G07F 11/44* (2006.01)
*B65G 1/02* (2006.01)
*G01G 19/414* (2006.01)

(52) U.S. Cl.
CPC ....... *G01N 35/00732* (2013.01); *G07F 11/44* (2013.01); *F25D 2700/08* (2013.01)

(56) References Cited

U.S. PATENT DOCUMENTS

| | | |
|---|---|---|
| 8,068,931 B2 | 11/2011 | Tran |
| 8,157,746 B2 | 4/2012 | Eberle |
| 8,175,746 B2 * | 5/2012 | Godlewski ............. G07F 11/62 700/242 |
| 9,406,187 B2 | 8/2016 | Hammonds |
| 10,974,953 B1 * | 4/2021 | Towers ................ G06Q 20/102 |
| 11,288,626 B2 * | 3/2022 | Conway .................... A47F 1/03 |
| 2004/0267621 A1 | 12/2004 | Schuller |
| 2005/0269366 A1 | 12/2005 | Brundick |
| 2008/0105588 A1 | 5/2008 | Tran |
| 2012/0029690 A1 | 2/2012 | Bruck |
| 2012/0253509 A1 | 10/2012 | Garda |
| 2014/0263631 A1 | 9/2014 | Muniz |
| 2015/0305970 A1 | 10/2015 | Lucey |

* cited by examiner

BULK FOOD STORAGE AND DISPENSING SYSTEM WITH AUTOMATIC LABEL CREATION

CROSS-REFERENCE TO RELATED APPLICATIONS

This application is a continuation of U.S. patent application Ser. No. 16/585,029, filed Sep. 27, 2019, which is a continuation-in-part application of U.S. patent application Ser. No. 15/423,197, filed Feb. 2, 2017, which are hereby incorporated by reference in their entireties. This application also claims the benefit of U.S. Provisional Patent Application No. 62/738,247, filed Sep. 28, 2018, which is also hereby incorporated by reference in its entirety.

FIELD

The following disclosure relates to integrated systems for dispensing, weighing, identifying, processing, and/or printing tag identifiers for items (e.g., bulk food items).

BACKGROUND

With consumers seeking to be environmentally friendly, bulk foods are arguably the number one emerging consumer trend in the grocery industry. Some advantages of bulk food sections in grocery stores (e.g., unpackaged food in bulk bins) may include a consumer may purchase precisely the amount of food they desire, bulk foods may be 25% cheaper on average than packaged counterparts, and/or bulk foods may carry 40%-50% profit margins.

Current drawbacks to bulk food dispensing, even in the most modern grocery stores, may include a time-intensive or annoying series of tasks such as the following: grabbing a plastic bag from a roll, placing the bag beneath a gravity-bin or next to a scoop-style dispenser, pulling the dispenser lever or turn the dispenser crank or screw, walking with the bag to a weigh-station (such as an old-fashioned analog baker's scale), writing the product name and weight on a sticker-label or twist-tie with a felt pen, sticking the sticker-label on the plastic bag, using an old-fashioned twist-tie to close and secure the bag, walking to the checkout line with the bag, validating the bag weight and manually inputting the item's unit price and item number by a store clerk, and generating another receipt at purchase.

Furthermore, due to these time consuming and confusing steps, the current processes may lead to high theft in grocery stores from shoppers writing incorrect item codes (inadvertently or intentionally) and/or low sales in the bulk food aisle.

What is needed, therefore, is a device or system that modernizes and integrates these functions in a unique way that technologically solves these issues, so the customer may select a desired amount of his/her product, and the device or system handles certain processing and/or checkout functions automatically.

BRIEF SUMMARY

The disclosure relates to integrated systems for dispensing, weighing, identifying, processing, and/or printing tag identifiers for items (e.g., bulk food items).

In one embodiment, a storage system includes a scoop bin configured to store a product, wherein the scoop bin has a lid configured to be moved between a closed position and an open position, and wherein the product is configured to be scooped out of the scoop bin by a customer when the lid is in the open position; a computing device; and a sensor positioned on the lid of the scoop bin, wherein the sensor is configured to monitor a movement of the scoop bin, wherein the sensor is configured to transmit a notification to the computing device identifying the movement of the scoop bin, and wherein the movement is an opening of the scoop bin, a closing of the scoop bin, or an opening and subsequent closing of the scoop bin, wherein a printer is configured to receive an instruction from the computing device to automatically print a label identifying the product stored in the scoop bin following the computing device receiving the notification of the movement of the scoop bin.

In another embodiment, a storage system includes a gravity-fed storage bin configured to store a product, wherein the gravity-fed storage bin has a dispensing handle configured to be moved between a closed position and an open position, wherein the product is configured to flow out of the gravity-fed storage bin by gravity when the dispensing handle is in the open position; a computing device; and an accelerometer sensor positioned on the dispensing handle of the gravity-fed storage bin, wherein the accelerometer sensor is configured to monitor a movement of the gravity-fed storage bin, wherein the accelerometer sensor is configured to transmit a notification to the computing device identifying the movement of the gravity-fed storage bin, and wherein the movement is an opening of the gravity-fed storage bin, a closing of the gravity-fed storage bin, or an opening and subsequent closing of the gravity-fed storage bin, wherein a printer is configured to receive an instruction from the computing device to automatically print a label identifying the product stored in the gravity-fed storage bin following the computing device receiving the notification of the movement of the gravity-fed storage bin.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The drawings described herein are for illustrative purposes only and illustrate selected embodiments of the present disclosure. The enclosed drawings are not intended to limit the scope of the present disclosure.

DETAILED DESCRIPTION

Figure 1A:
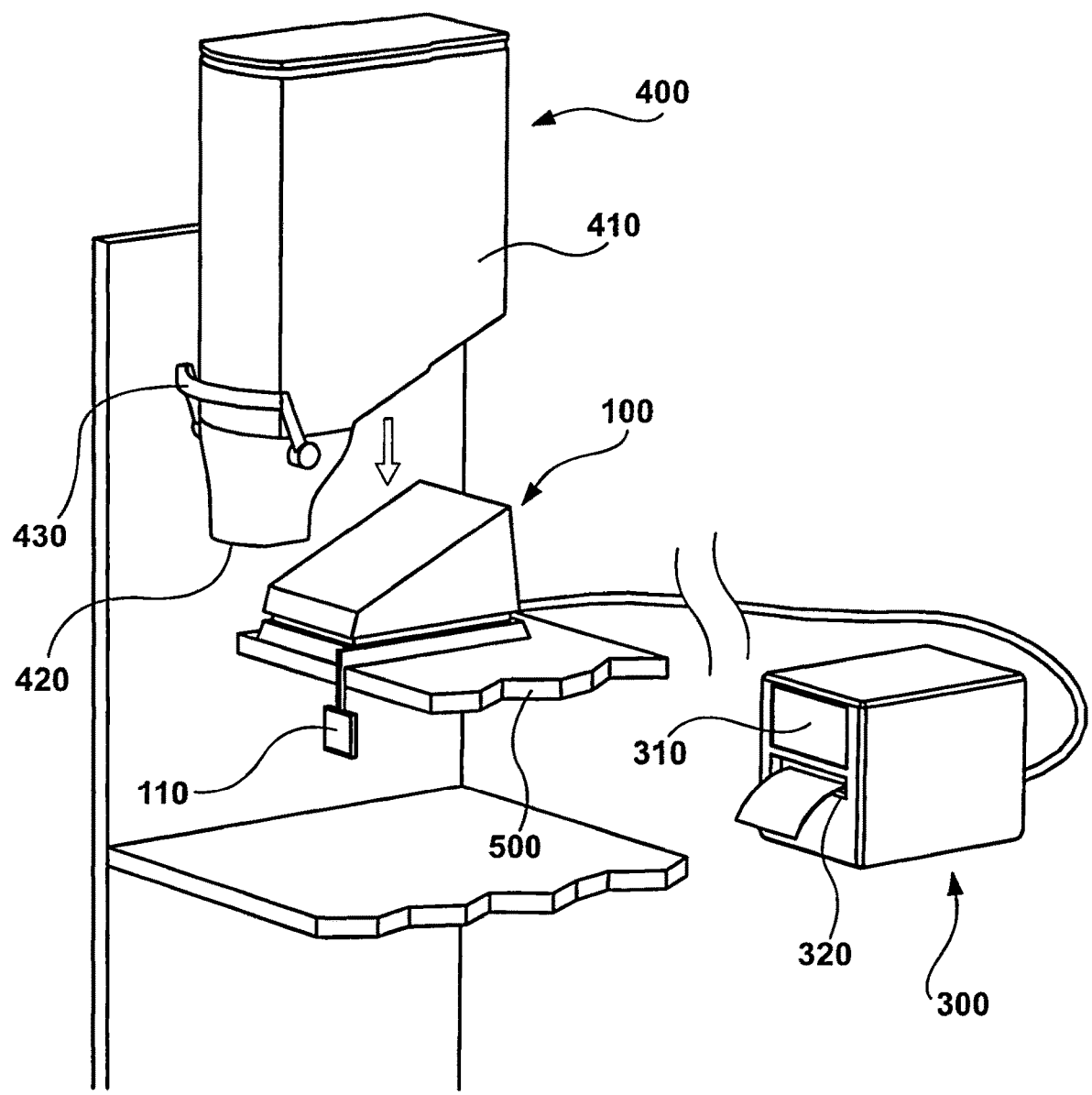
FIG. 1A depicts an angled side view of an example of an exterior of a bulk food dispenser with an integrated scale (herein as a pressure plate scale base, herein shown separated from the gravity bin hopper) and front-facing display (e.g., LCD or other electronic visual display monitor), and the central printing and user-interface kiosk station ("pre-checkout" station), generating a sticker-label including a barcode or RFID tag.

The devices and systems described herein provide solutions to bulk food and/or other items (e.g., dry goods or hardware items) that may be stored in a storage bin and sold in bulk. The devices and systems described herein may include the placement of a sensor on or near an opening of a storage bin (e.g., near a dispensing handle or near a lid), wherein the sensor is configured to monitor a movement (e.g., an opening or closing) of the storage bin and alert a connected kiosk to print a label identifying the item stored within the storage bin that has been opened/closed. Additionally, or alternatively, the devices and systems described herein may include a sensor configured to monitor a change in a weight of the storage bin, and the printed label may include information identifying the dispensed weight of the item.

These devices and systems are advantageous in reducing theft or loss of sales in the sale of the bulk food items due to the automatic printing of a label identifying the specific bulk food or item dispensed. In other words, the devices and systems disclosed herein reduce or eliminate the risk of a customer mislabeling the dispensed good (e.g., with a lower priced bulk food item or with an incorrect, lower weight). Furthermore, by automatically generating a label for the bulk food item, the devices and systems are advantageous in speeding up the purchase process for the consumer and the store. For example, the consumer may spend a shorter amount of time retrieving and labeling the bulk food item at the bulk food dispensing device or system. Additionally, the scanning of the label at checkout may be advantageously faster than a store employee having to look up a code for a bulk food item and weigh the item (e.g., like the checkout of a produce item).

Additionally, certain devices and systems disclosed herein may be advantageous in their ability to interact with existing bulk food dispensing systems. In other words, the devices and systems may be able to retrofit and improve a current system through the installation of a sensor on a currently installed storage bin (e.g., a gravity-fed storage bin or a scoop bin), and the addition of a kiosk that is in communication with the newly installed sensor. This is advantageous in providing a low-cost upgrade to a current bulk food system.

Definitions

As used herein, a bulk food dispenser or storage bin may refer to a storage and delivery component for various items such as bulk foods, dry goods, or hardware items. Examples are gravity bin dispensers, scoop bins, inversion bins, "loss-in-weight" gravimetric feeders, volumetric feeders, or any bulk food delivery mechanism for the systems described herein.

As used herein, a display may refer to an electronic display screen, such as a liquid crystal display (LCD), light emitting diode (LED) display, or any other method of displaying information about the items being dispensed from the storage bins, such as a "real-time" read-out of the amount of bulk food product dispensed from the storage bin's chute/spout. A display may be positioned adjacent to each storage bin. Alternatively, or additionally, a display may be part of part of a central hub or kiosk. In certain examples, the display associated with the storage bin or kiosk may be a touchscreen display or include a touchscreen interface.

As used herein, a hub processor may refer to a central processing unit of a system including the bulk food dispensers or storage bins. The "hub" may include a touchscreen interface display and a (e.g., thermal) printer. The hub processor may be associated with or positioned adjacent to a central kiosk of the system. The hub processor may alternatively be positioned in a bracketed slot for a storage bin. The hub processor may be configured as the system's central customer touchscreen and printout station.

As used herein, a hopper may refer to the section of the storage bin that stores the bulk food or other items. The hopper may be configured to receive a replaceable storage bag to easily replace a depleted bin or change out a supply of an expired or low-selling article.

As used herein, a chute or food reservoir may refer to a spout section of a gravity-fed storage bin dispenser.

As used herein, a pressure plate may refer to a digital scale including a weighing mechanism or device for weighing articles (e.g., bulk food items). The pressure plate may be configured to generate and transmit a notification or signal to a display that signifies the weight of the article (e.g., bulk food) being measured.

As used herein, a scale or digital scale may refer to a strain gauge scale, digital load cell, pressure plate, hanging spring scale, or any weight scale configured to electronically transmit the weight of an article (e.g., bulk food item) being dispensed from a storage bin to a system's hub processor/kiosk and display(s). Digital spring scales, strain gauge scales, hanging spring or digital load cells, or any electronic scale may be used in the embodiments disclosed herein.

A label or receipt may refer to a tag or sticker generated by a printer associated with the system's hub processor or kiosk that identifies an article (e.g., bulk food item) that has been dispensed or retrieved from a storage bin. The label may be configured to be optically scanned at a checkout counter. For example, the label may include a barcode such as a universal product code (UPC), international article number (IAN) code, or stock keeping unit (SKU) code. Alternatively, the label may a type of matrix barcode such as a quick response (QR) code. In other embodiments, the label or receipt may include a smart label such as a radio-frequency identification (RFID) configured to be scanned or captured via radio waves. In yet other embodiments, the label or receipt may include a printout or alpha-numeric identification for a particular article (e.g., bulk food), which is configured to be entered at checkout.

As used herein, an actuator may refer to a component of the storage bin dispenser configured to respond to a control signal (e.g., from the hub processor) to open and/or close the dispenser chute.

As used herein, a load cell may refer to a sensor or type of digital scale, in which a transducer is used to create an electrical signal whose magnitude is directly proportional to the force (e.g., weight) being measured. The force may be loaded onto a top plate, which may be mounted above a base plate, with a spacer plate, or "spacer," positioned between the load cell and the base. The load cell may be a resistive or capacitive load cell. For example, a resistive load cell monitors a change in resistance (e.g., via piezo resistivity) when a load, force, or stress is applied to the sensor.

As used herein, a dead end may refer to an electrical circuit's ground.

As used herein, the singular forms "a," "an," and "the" include plural referents unless the context clearly dictates otherwise.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

FIGS. 1A-9 depict embodiments of storage systems that may include a load cell sensor configured to monitor a weight of the dispensed item. In these examples, the storage system may include a kiosk and printer configured to print a label. The label may include identifying information regarding the type of product dispensed as well as the weight and/or cost of the dispensed item (based on the measured weight difference by the load cell sensor).

For example, FIG. 1A depicts an example of a storage system that includes an integrated scale 100, (e.g., a digital strain gauge scale or load cell or "pressure plate,") positioned below a bulk food bin dispenser 400 hopper bin 410. The scale 100 is uniquely designed to fit underneath the hopper of the gravity bin. In this illustrated embodiment, the system's physical components rest on a shelf 500. The integrated scale 100 functions as a digital scale, calibrated to measure changes in the weight of bulk food in the dispenser. When the customer pulls down the dispenser lever 430 and waits for the desired amount of food to fall through the valve in the chute 420, the integrated scale 100 senses the difference in weight and transmits this data to a central hub processor 300, which processes the weight difference. The hub processor 300 then sends this information back to the customer's label-display as a readout on an electronic visual display 110, e.g., an LCD monitor. Alternatively, the processor can query the scale 100 at a set time interval, and the scale 100 will send a transaction report to the touchscreen user interface 310 and printer 320 of the hub processor 300.

The hub processor 300 can alternatively be connected to any number of dispensers, printers and user interfaces, either locally or remotely. Alternatively, the display 110 can be shown as any display or label substantially near the dispenser 400. The dispensed-food's weight is also transmitted to the printer 320, which generates a receipt or transaction report with a barcode and product information and indicates the important receipt information on the touchscreen interface display 310 of the hub processor 300. Receipt information may contain the dispenser bin number (not shown), the type of bulk food product (e.g., coffee beans, rice, granola, etc.), the unit price, the portion weight, the item's total price, and other receipt identifiers programmed by the grocer into the hub processor 300 during initial formatting and set-up. The hub processor 300 may also be accessed to research prior transactions. Errors may be fixed via the touchscreen interface 310. The System's preferred embodiment for the printer's 320 receipt is a sticky Bar-Coded Bag Tag, in the same fashion as airline luggage bag tags, sealing the customer's receptacle bag in addition to functioning as an identifier. New, or replacement receipts (bar coded sticky bag tags) can be generated at the customer's behest.

The scale 100 and hub processor 300, display 310 and printer 320 are "integratable," in that these aspects of the system may be infused into existing, non-automated bulk food dispensing systems in order to modernize them.

Figure 1B:
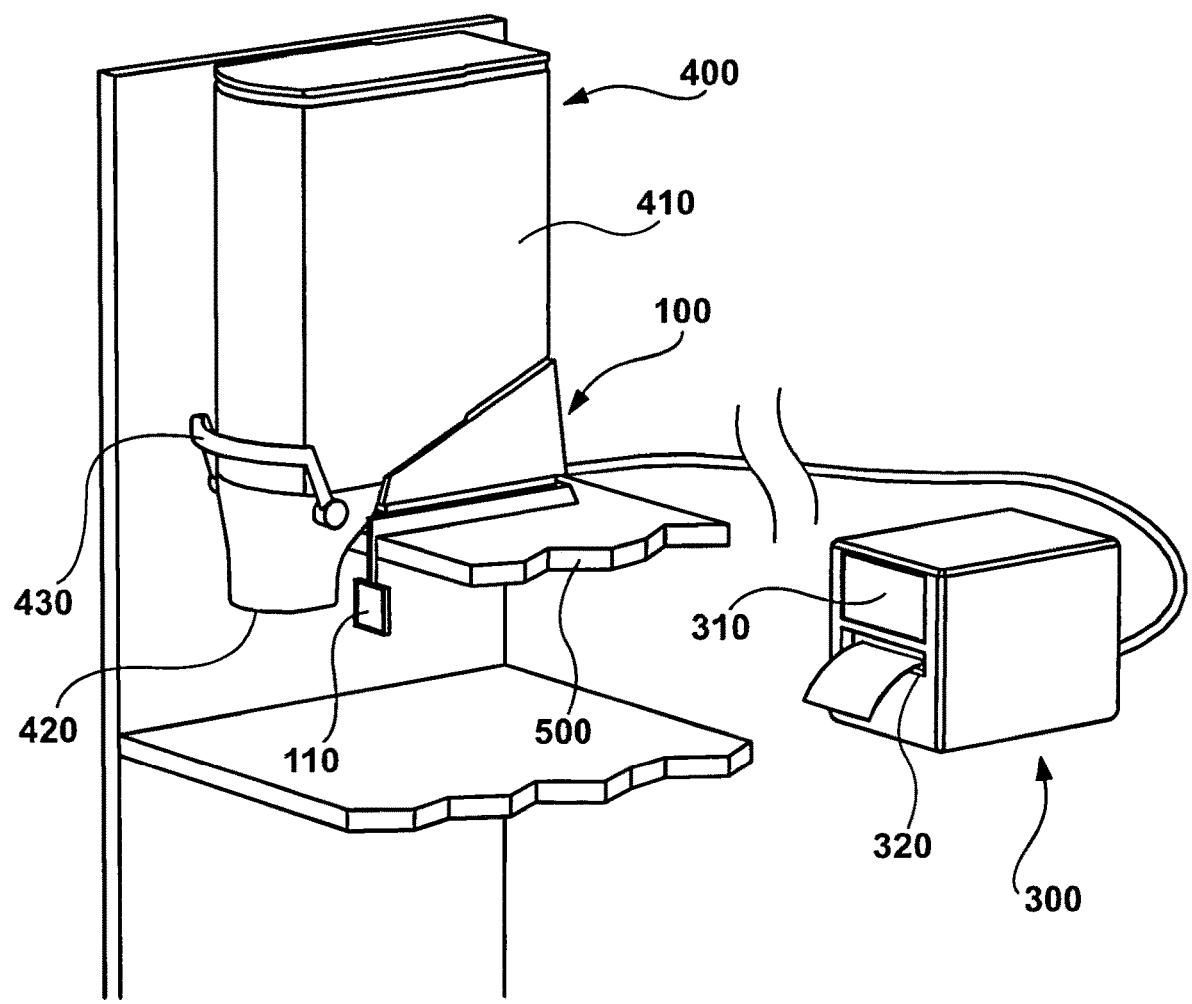
FIG. 1B depicts an angled side view of an example of a bulk food dispenser including the electronic visual display monitor, with the integrated scale underneath (herein shown assembled), wherein the integrated scale is connected to the printer (herein shown without touchscreen).
Figure 5A:
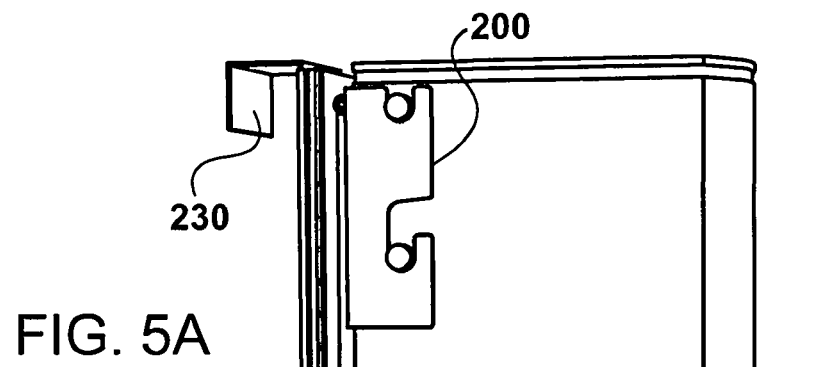
FIG. 5A depicts a side view of an example of dispenser and scale components of the storage system in which the integrated scale is mounted between the bracket arms and the wall, door or rack-tower via "over the door" hook, with the bracket arms in upright position.

FIG. 1B is the same "stripped-down" embodiment of the System as that in FIG. 5A, herein shown with the hopper 410 resting on the scale 100 as it would be positioned when installed.

Figure 2:
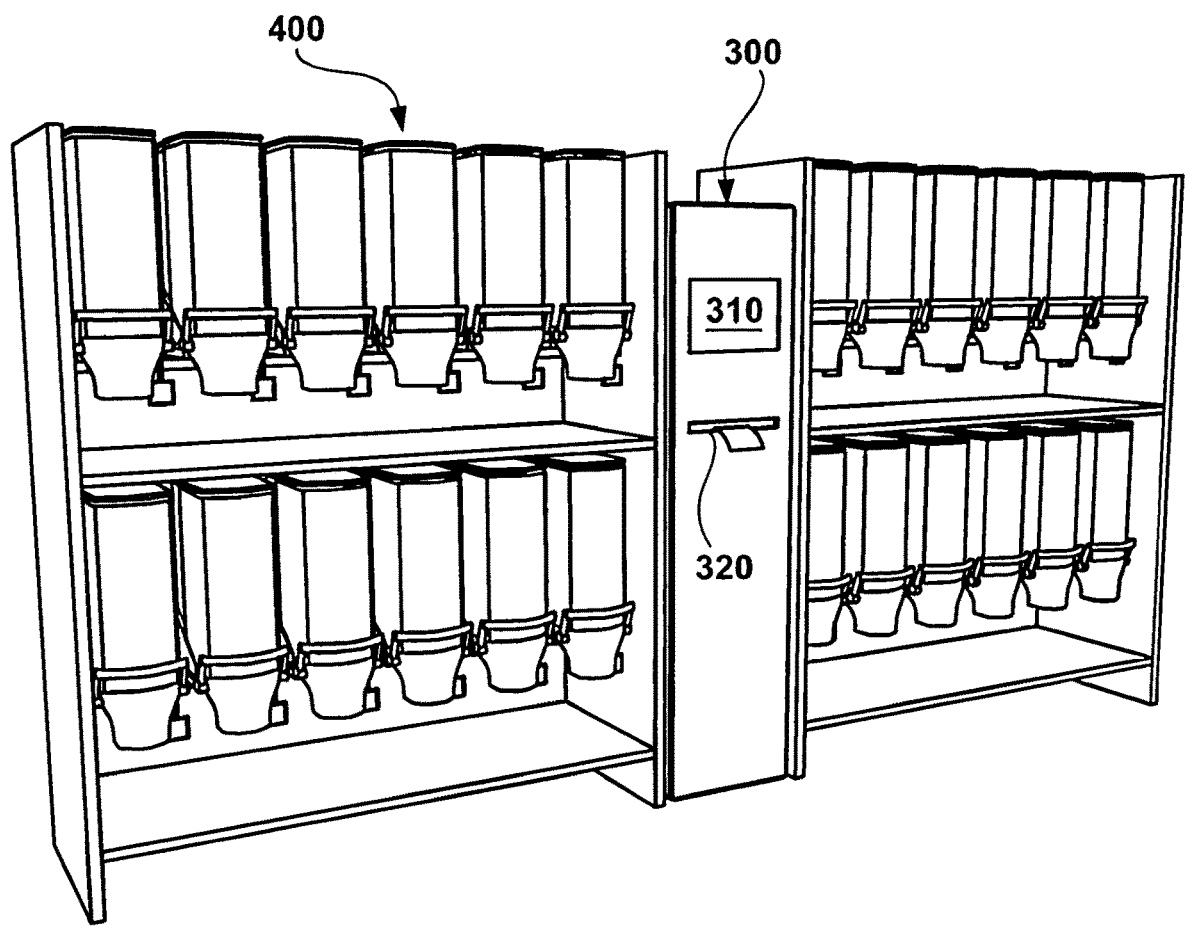
FIG. 2 depicts an angled front view of an example of a bank, or two-tiered tower, of two rows of bulk food dispensers in a rack-tower layout, with the central customer touchscreen kiosk and printout station in the middle of the dispenser rows. A scale may be integrated into each individual dispenser, or into each chute component, either below the drum or compartment-valve, or may be mounted as a hanging spring-scale or digital load cell beneath each dispenser.

FIG. 2 is an angled view of the front of a bank layout of two rows of bulk food dispensers, with the central customer touchscreen and printout station (including the hub processor 300) positioned in the middle of the dispenser rows as a central kiosk in the embodiment shown. In alternative embodiments, the scale can be integrated into the dispenser chute 410, either below the drum or screw or compartment-valve. The scale may alternatively be mounted as a hanging spring-scale or digital load cell beneath. Here, each gravity bin 400 utilizes a scale attached to/integrated with its rear bracket mount to measure the change in weight associated with a customer's purchase (these "bracket-scales" are featured in FIGS. 3-5, infra). The scale then electronically transmits the digital data (re: food portion weight, unit price, etc.) to the hub processor 300, which then processes, stores and transmits receipt info to the printer 320 and the user touchscreen interface 310.

Figure 3A:
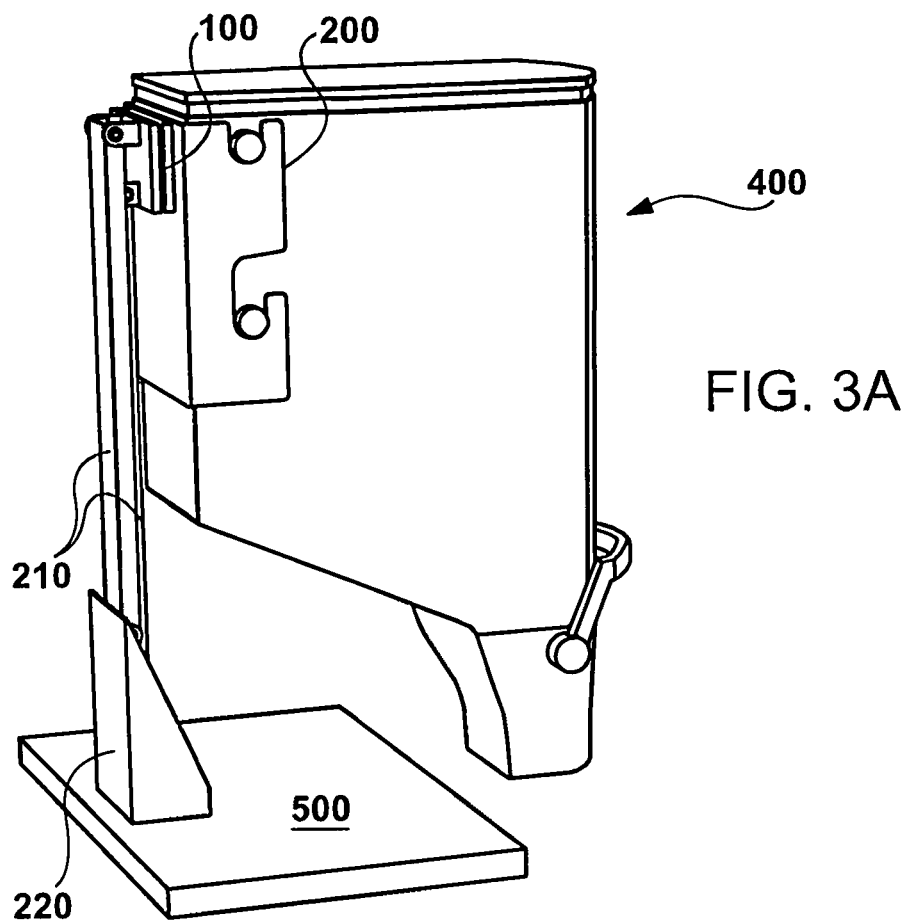
FIG. 3A depicts a side-rear view of an example of dispenser and scale components of a storage system. In this embodiment, the integrated scale is mounted behind the gravity dispenser bracket's connecting piece, with the bracket arms in upright position.

FIG. 3A depicts the System wherein the scale 100 is a strain gauge scale 100 integrated into the bin's 400 mounting bracket 200. The gravity bin 400 is attached to a bracket 200, which is attached to the strain gauge scale 100, which measures strains on its internal beams to process weight changes. In this embodiment, the strain gauge scale 130 senses the change in compression at its front-side beam, digitally processing this information into a "change in weight Delta," then transmitting this information to the System's hub processor 300.

The dispenser bracket arms 210 can be extended forward for easy access to the bin. The unit shown has a molded base stand 220. In alternative embodiments, the molded base stand 220 can also comprise the scale 100. In the embodiment shown, these working components rest on a base shelf 500, which also can comprise the scale 100.

Figure 3B:
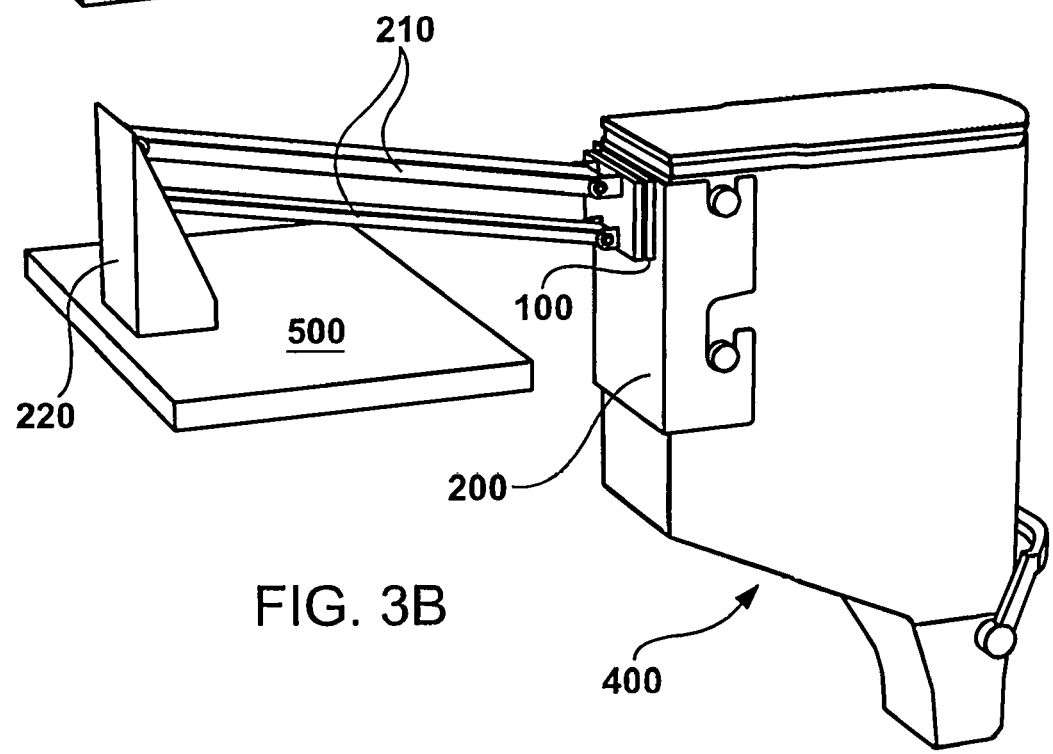
FIG. 3B depicts a side view of an example of dispenser and scale components of the storage system. In this embodiment, the integrated scale is mounted behind the dispenser bracket's connecting piece, with the bracket arms in an outstretched (e.g., horizontal) position.

FIG. 3B illustrates the bracket-scale components of the System with the bracket arms 210 positioned forward.

Figure 4A:
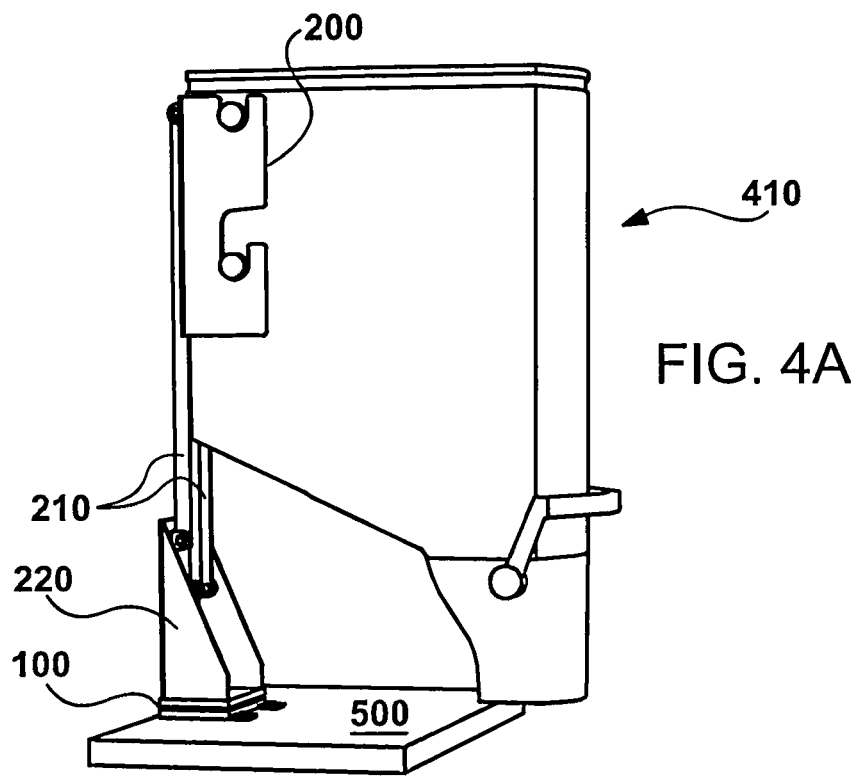
FIG. 4A depicts an angled-side view of an example of dispenser and scale components of the storage system. In this embodiment, the integrated scale is positioned underneath the dispenser bracket's base-stand, with the bracket arms in upright position. The integrated scale shown herein is a digital load cell, otherwise known as a "pressure plate" scale.

FIG. 4A illustrates an embodiment of the System wherein the integrated scale 100 is a pressure plate scale positioned underneath the bracket base 220. The bin hopper's 410 notches, or bolts, rest on the mounting bracket 200. In this embodiment, the integrated scale 100 is positioned underneath the base stand 220 between the shelf 500 and the base stand 220. The bracket arms 210 remain in a substantially vertical position, parallel with a wall or rack behind the gravity bin hopper 410.

Figure 4B:
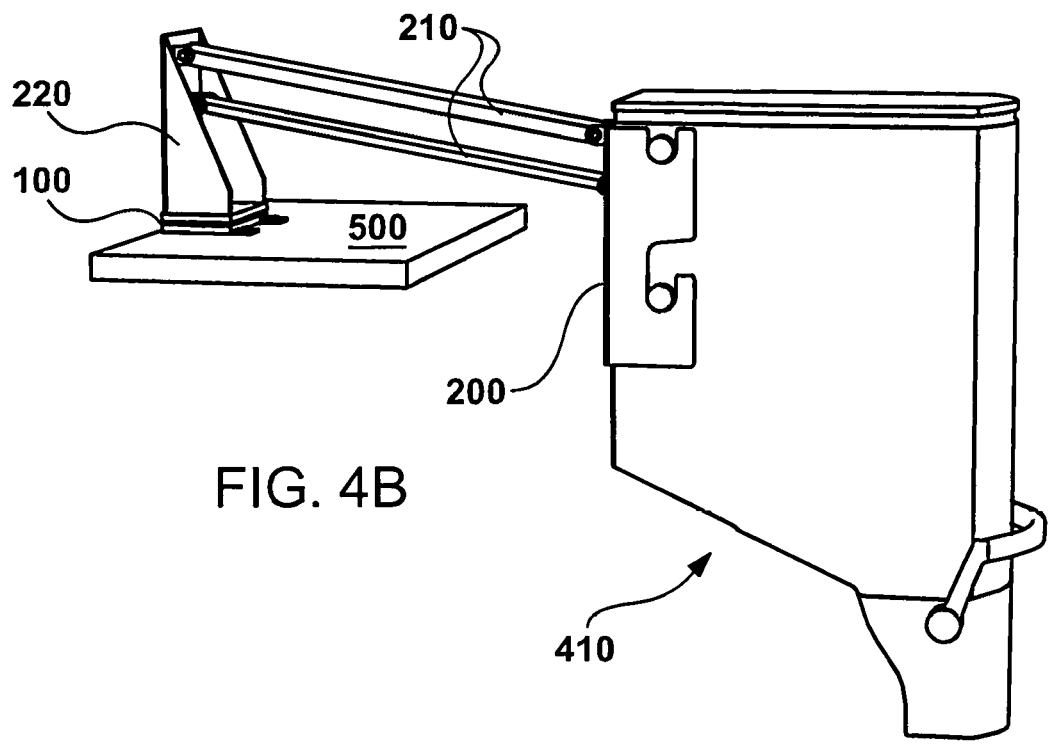
FIG. 4B depicts an angled-side view of an example of dispenser and scale components of the storage system. In this embodiment, the integrated scale is positioned underneath the dispenser bracket's base-stand, with the bracket arms in a substantially horizontal-outstretched position. The scale shown is a digital load cell, otherwise known as a "pressure plate" scale.

FIG. 4B illustrates the same embodiment as that shown in FIG. 8A, with its bracket arms 210 positioned forward, toward the customer for easy food dispensing.

FIG. 5A illustrates an embodiment of the System wherein the scale 100 is integrated or built into the wall-plate section of the bracket 200. The bracket 200 and scale 100 are then mounted to a wall, rack or display tower via an "over the door" hook 230.

Figure 5B:
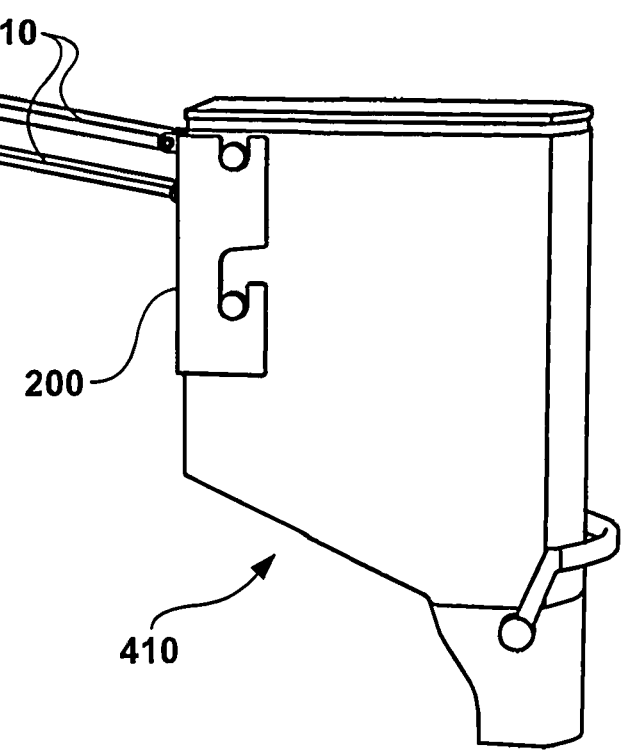
FIG. 5B depicts a side view of an example of dispenser and scale components of the storage system in which the integrated scale is mounted between the bracket arms and the wall, door or rack-tower via "over the door" hook, with the bracket arms in a substantially horizontal, outstretched position.

FIG. 5B illustrates the same embodiment as that shown in FIG. 9A, with its bracket arms 210 positioned forward for easy customer food dispensing.

Figure 6:
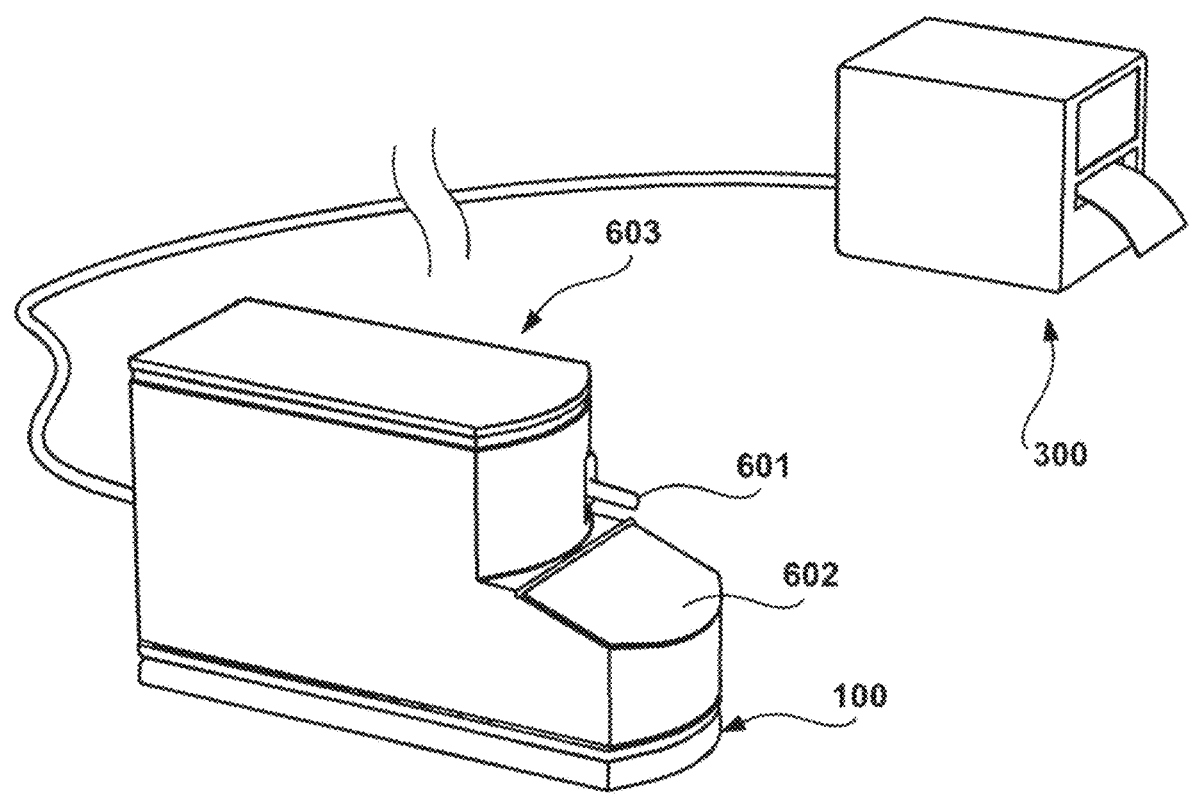
FIG. 6 depicts an angled-side view of an example of the storage system having a scoop bin. In this embodiment, the pressure plate integrated scale is positioned underneath the scoop bin.

FIG. 6 shows the System with a Scoop Bin rather than a gravity bin. Here, a pressure plate scale 100 serves as the System's integrated scale 100. The shovel-type scoop 601, or tongs, rest in a scoop holder. The scoop bin has a door 602 which the customer opens to scoop out their desired bulk food portion. The grocer refills the bin via the lid 603. The scale 100 shown herein is a pressure plate scale 100 positioned under the scoop bin, or alternatively built into the base of the scoop bin. The System transmits weight and identifying information to the hub processor 300 as in other embodiments.

Figure 7:
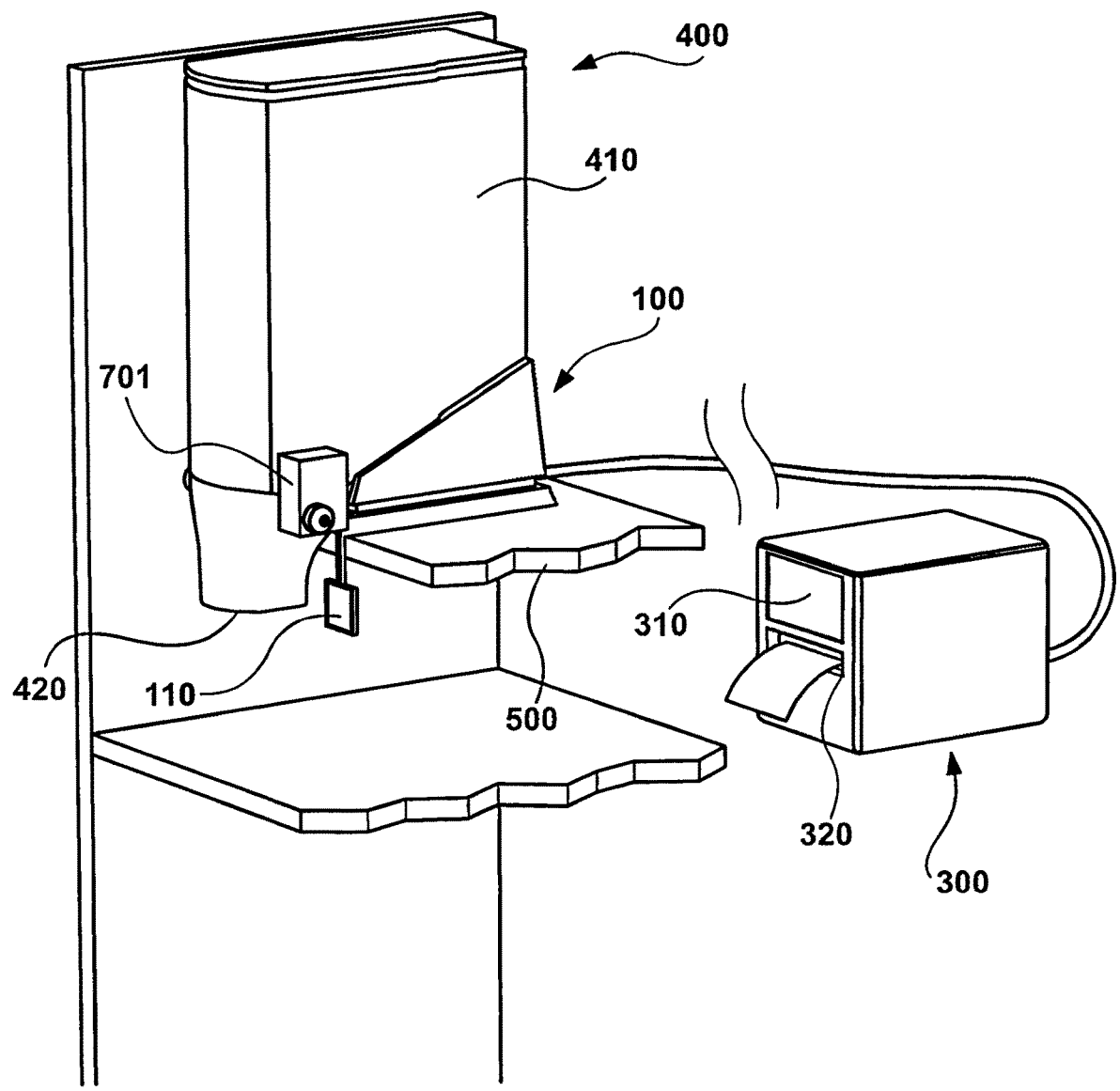
FIG. 7 depicts an angled-side view of an example of the storage system in which the customer's portion of bulk food may be dispensed automatically, without the customer using a hand-lever or dispensing handle. In this embodiment, a valve-actuator replaces the hand-crank/hand-lever component of the dispenser. In this embodiment, the actuator box and internal actuator axle (not shown) are configured to open and close the dispenser chute's valve.

FIG. 7 illustrates a "Smart Dispenser" embodiment of the System in which the customer's portion of bulk food is dispensed automatically, without the customer needing to use a hand-lever or crank 430 (not shown). In the embodiment shown, an actuator 701 replaces the hand-lever component of the dispenser. In this embodiment, when the customer inputs their desired portion into the touchscreen interface 310, the hub processor 300 prompts the actuator 701 box to rotate the internal actuator axle (not shown) to open the dispenser chute's 420 valve.

In this embodiment, the customer chooses the product and desired portion via the touchscreen interface 310, and the bulk food comes out of the chute 420 into the customer's bag. In an alternative embodiment, a bank of hoppers (similar to FIG. 6) each may feed into the same chute 420, eliminating the need for a wall, or bank of chutes 420. Alternative "fully-automated" Systems feature a keypad next to each "Smart Dispenser," and the dispenser measures portions by flowrate or change-in-volume (volumetric feeders), thereby dispensing the customer's desired portion.

Figure 8:
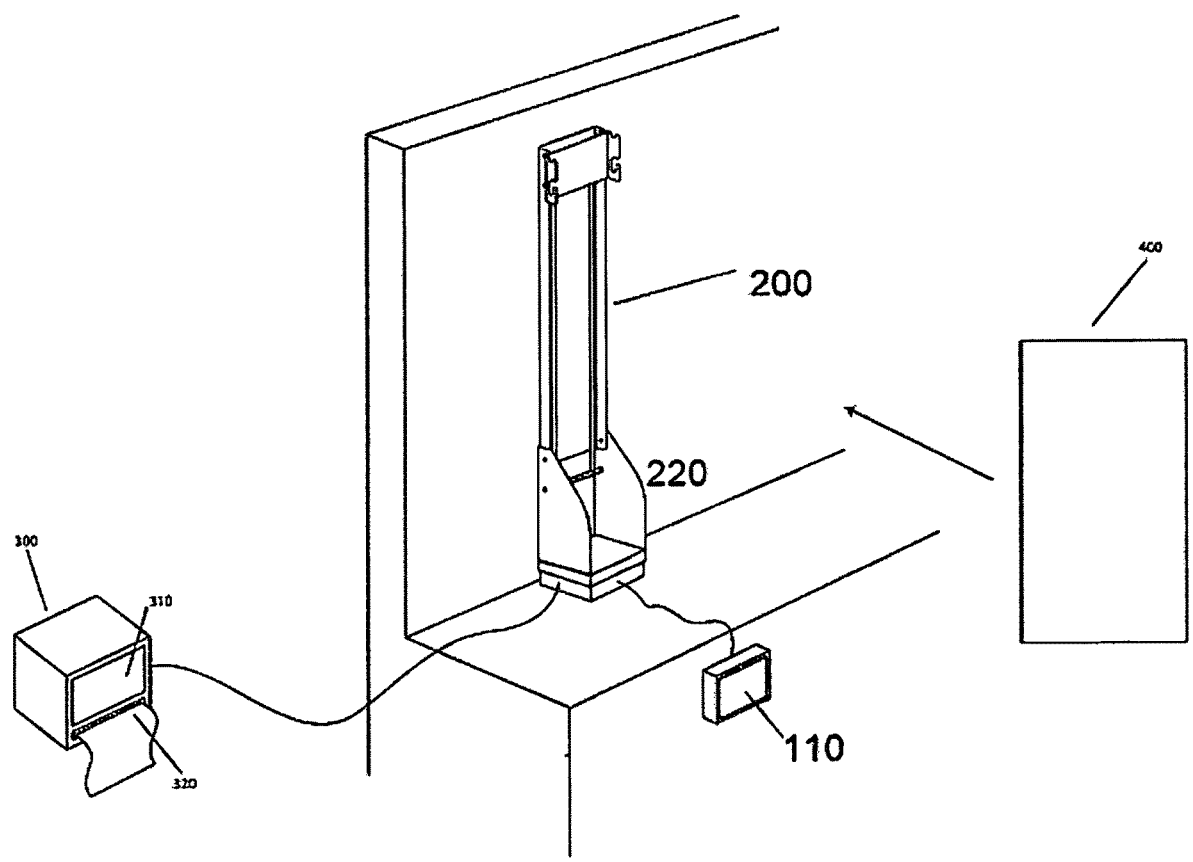
FIG. 8 depicts a landscape front view of an example of the storage system. In this embodiment, the integrated scale is positioned underneath the dispenser's bracket base. The bracket does not have hinged moveable arms, but rather the gravity dispenser fits into the wall bracket, which is fixed against a shelf, rack, tower or wall type fixture. In addition to the central touchscreen display, an individual screen is positioned in front of the scale and within the immediate purview of the customer, configured to display the customer the item, portion dispensed, price, and other indicators discussed herein.

FIG. 8 is a landscape front view of one embodiment of the System. In the embodiment shown, the integrated scale 100 is positioned underneath the dispenser's bracket base 220. In the embodiment shown, the bracket 200 does not have hinged moveable arms, but rather the gravity dispenser 400 (herein shown as "black box") fits into the wall bracket 200 by resting in the bracket's 200 top notches. The bracket 200 is fixed against a shelf, rack, tower or wall fixture. In addition to the central touchscreen interface 310 display, the embodiment shown features an individual display screen 110 positioned in front of the scale 100 and within the immediate purview of the customer, easily showing the customer the item, portion dispensed, unit price, price of portion, and other indicators discussed infra. In alternative embodiments, the individual screen 110 can be replaced by a label showing the same information, either in electronic, written and/or audible form.

Figure 9:
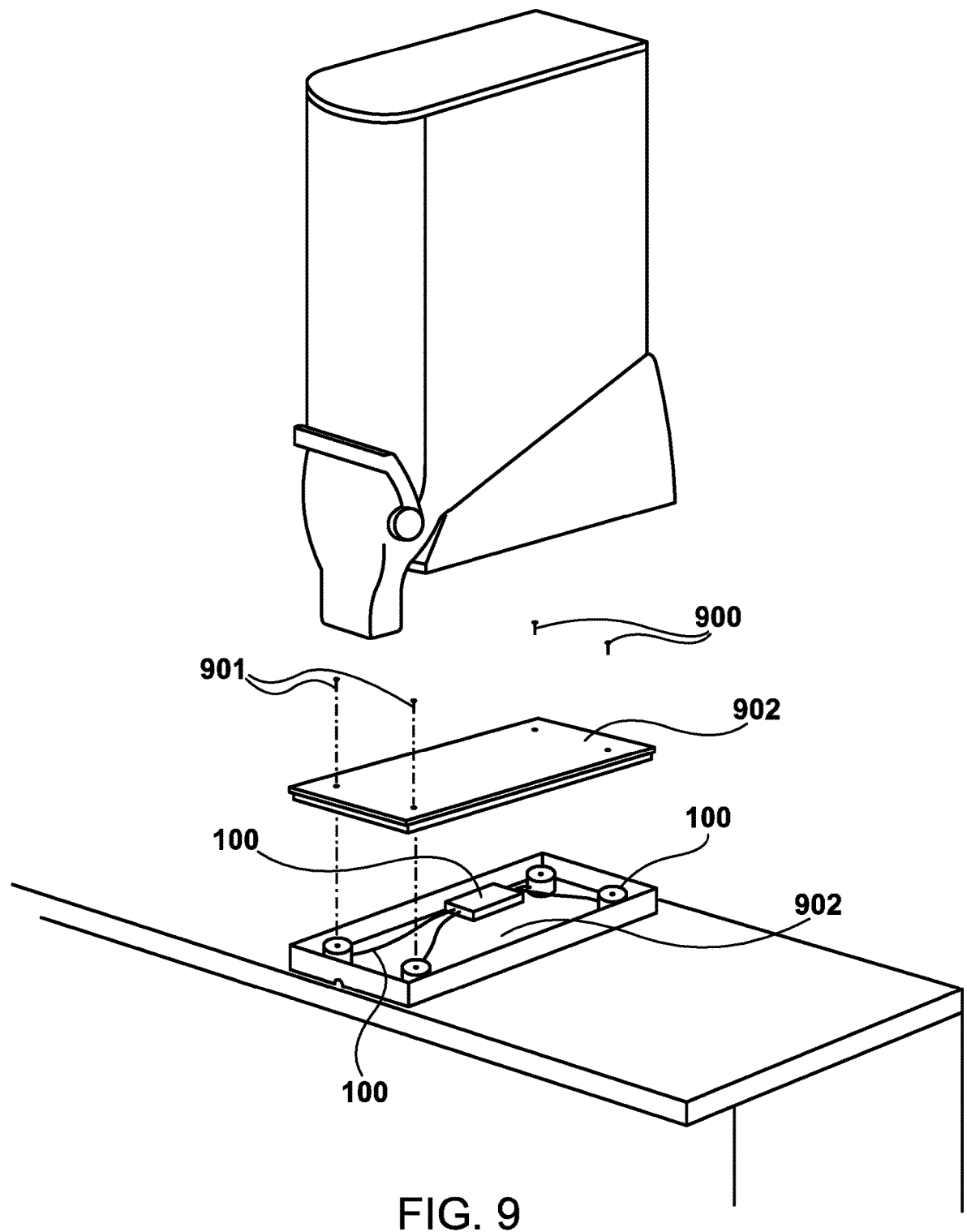
FIG. 9 depicts a landscape, exploded view example of a pressure plate load cell integrated scale in the storage system. In this embodiment, the positioning of various components digital load cell, or pressure plate, are shown (while the remainder of the hub processing and printing features are not shown).

FIG. 9 is a landscape, exploded view of the System, this embodiment featuring a pressure plate load cell integrated scale 100. In the embodiment shown, the positioning of various components of the digital load cell 100, or "pressure plate," are shown. The remainder of the hub processing 300 and printing 320 features not shown in FIG. 13.

In this sample embodiment, installation of the integrated scale 100 System into a preexisting, bracketed gravity bulk food dispenser 400 proceeds as follows: drill adequate number of holes into shelf 500 or foundation; bolt 901 down a base plate 902 between foundation shelf 500 and scale 100; install integrated scale 100 (digital load cell, pressure plate) above the spacer 903 by untightening the spacer bolts, fitting the load cell (scale 100) above the spacer 903; screw the dead end of the load cell 100 into the horizontal base plate 902; proceed to retightening and aligning bolts 901; then connect and calibrate load cell 100 with processor 300 (not shown) for accurate weight detection, transmission, processing and display at label display 110 and central hub processor 300 LCD display (not shown).

Figure 10:
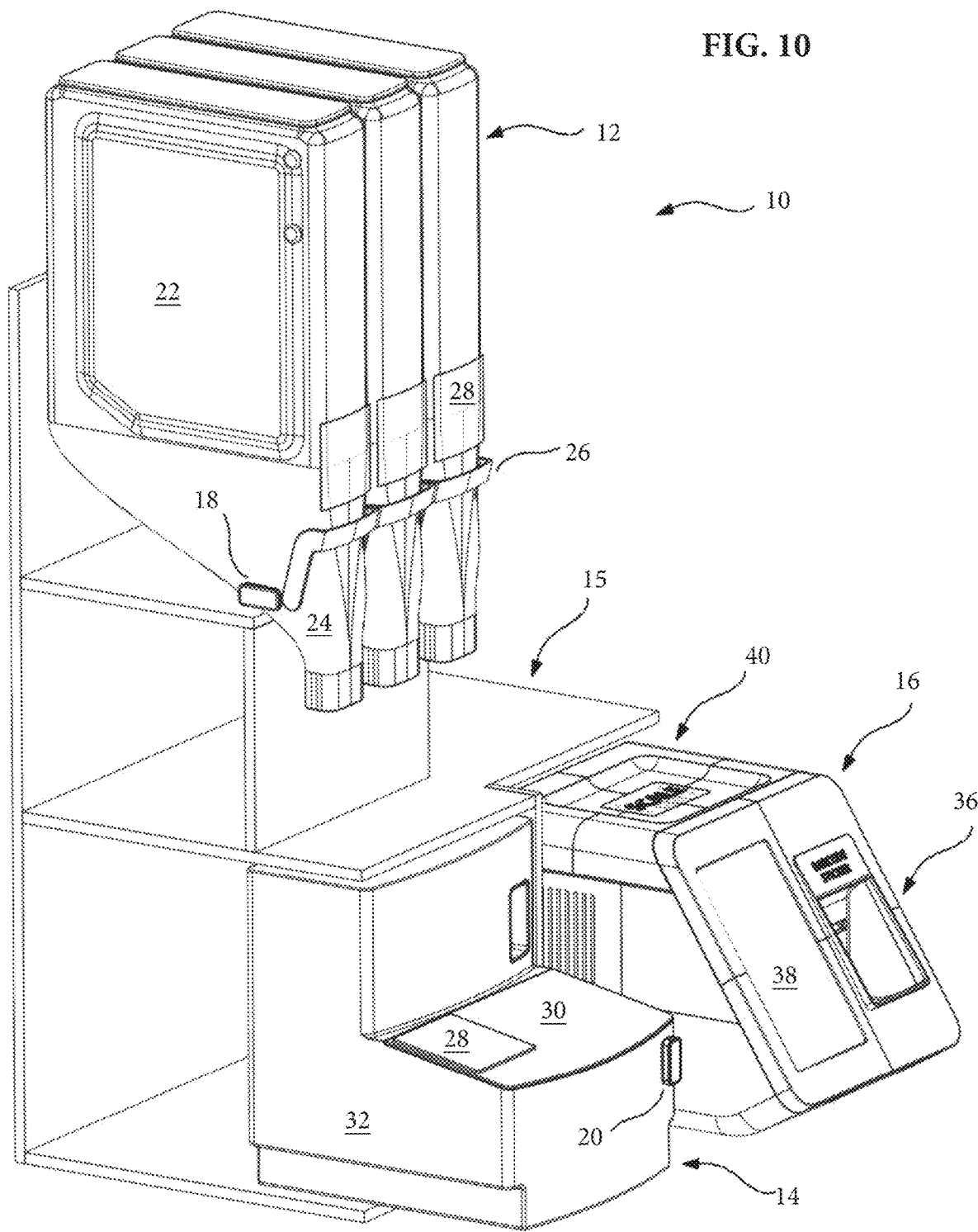
FIG. 10 depicts an angled view of an example of a bulk food dispensing system having three gravity-fed storage bins, one scoop bin, and a kiosk. In this example, each of the storage bins includes a sensor configured to monitor when the respective storage bin is opened and/or closed.
Figure 11:
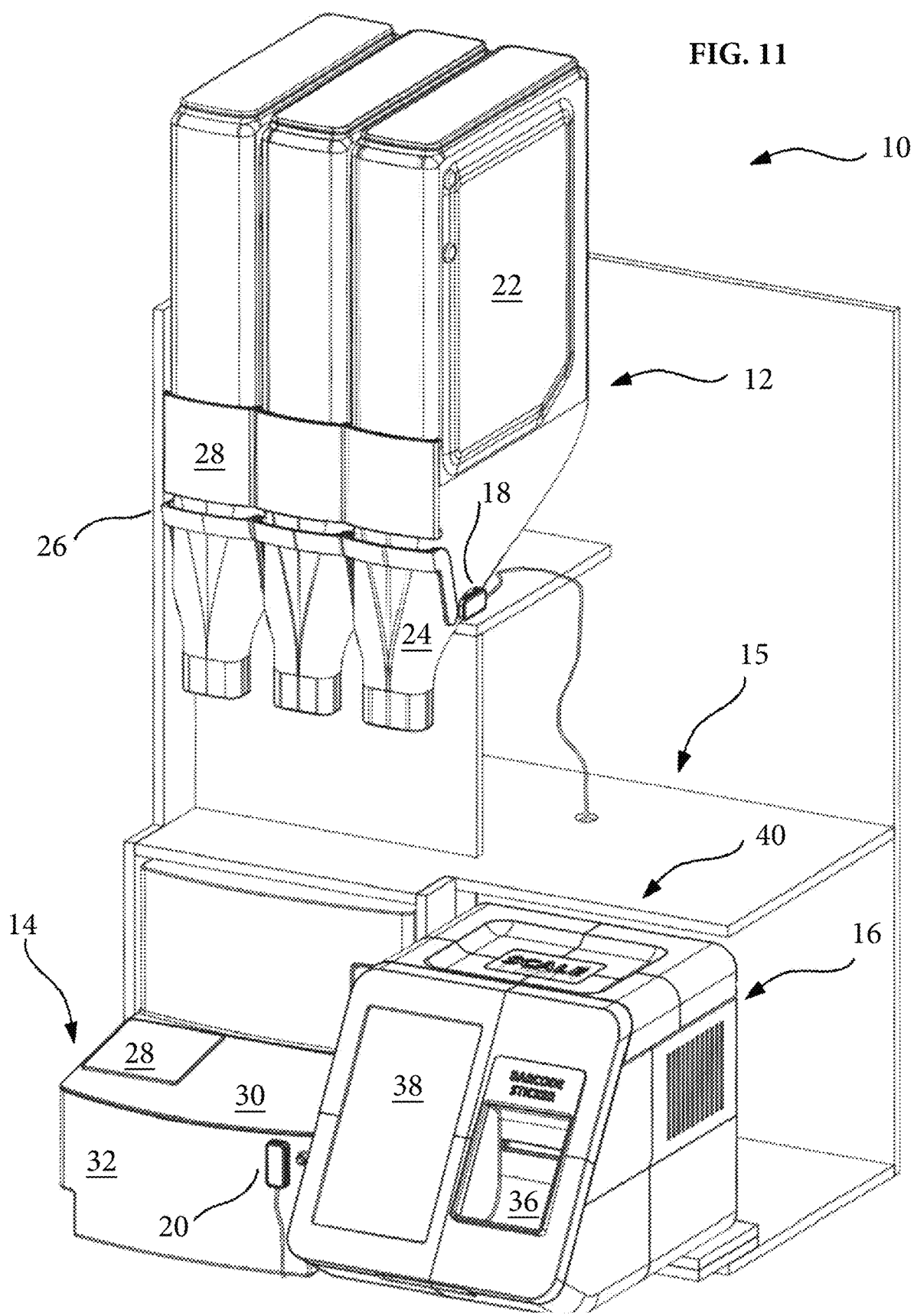
FIG. 11 depicts an additional example of a bulk food dispensing system having a wired connection between a sensor and kiosk.

A working variation of this embodiment covers "receiptless" transactions in stores in which bar-code optical scanning and/or RFID-Tags digitally replace the checkout process, such as Amazon-Go™, type Systems. In such instances, the instant System works without the printing 320 aspect of the hub processor 300. In place of a print[ed] 320 receipt, the bulk product identifiers (unit price, weight, total price and other useful information infra) are processed through the System's hub processor 300 into the store's Network-Checkout Application in the same way the System Application processes the store's digitally labeled packaged-foods. The instant System's hub processor 300 may therefore be decentralized or linked via computer network Server. Systems with Automatic Label Creation FIGS. 10 and 11 depict examples of bulk food storage and dispensing system 10 having a plurality of storage bins 12, 14, a kiosk 16, and a sensor 18, 20 associated with each storage bin 12, 14. The storage bins 12, 14 and kiosk 16 may be attached to or supported by a support frame 15. In certain examples, the dispensing system 10 may include a plurality of support frames for housing a plurality of storage bins and kiosks. In some examples, a single central kiosk is provided for an entire storage system. In other examples, a plurality of kiosks may be provided, wherein each kiosk of the plurality of kiosks may support a section of the entire storage system.

The storage bins 12, 14 may be configured to store one or more articles or items configured to be dispensed or removed from the bin by a customer upon activating a dispensing handle (e.g., hand crank) or opening a lid of the storage bin.

In certain examples, the articles or items stored in the storage bins may be bulk food items. Non-limiting examples of bulk foods include nuts, dried fruit, snacks, spices, herbs, seasonings, seeds, chocolate, candy, beans, vegetables, rice, grains, pastas, cereals, and so on.

Additionally, or alternatively, other articles or items besides bulk foods may be stored within one or more of the storage bins. These other articles or items may be any type of dry food, dry good, or small hardware items (e.g., nails, bolts, screws, fasteners) that could be readily dispensed from or scooped out of a storage bin and paid for by an overall weight of the dispensed item, rather than by unit. This is advantageous in potentially tracking usage/sales of such items and/or eliminating the need to record item numbers.

In certain examples, the system 10 includes a plurality of storage bins configured to store one or more bulk foods or other articles/items. The system 10 may include one or more gravity-fed storage bins 12 or one or more scoop bins 14.

A gravity-fed storage bin 12 may include a hopper 22 configured to store the bulk food. The hopper 22 may be configured to receive and house an inner container (e.g., bag) containing the bulk food. This is advantageous in removing an empty container, expired bulk food item, or low-selling item with a new full container without contaminating the inner surface of the hopper 22. In other words, one bulk food container could be removed and replaced with a second, different bulk food container on-the-fly with little cleaning of the hopper and minimal cross-contamination between different bulk food items. The interchangeable container may have an area or section near the base of the container that is configured to be opened after the container has been inserted into the hopper. The container may be opened by an operator by reaching through the reservoir or chute to access the section at the base of the container to open the container.

The gravity-fed storage bin 12 may also include a chute or reservoir 24 positioned at the base of the hopper 22. The reservoir 24 provides an intermediate location between the hopper 22 and dispensing of the bulk food into a bag or container of a customer. The reservoir 24 may be advantageous in providing a visible identification of the bulk food item that may be concealed within the hopper. Additionally, the reservoir 24 may advantageously provide extra storage volume to store the bulk food items. In other words, when the hopper has been emptied, a remaining amount of bulk food may be stored within the reservoir 24. This allows for easy removal and replacement of an inner container in the hopper with little or no bulk food being wasted (i.e., the hopper can be completely emptied prior to replacement because a percentage of the bulk food originally stored in the hopper remains within the reservoir).

The gravity-fed storage bin 12 may also include a dispensing handle 26 positioned near a base of the gravity-fed storage bin 12, wherein the bin is configured to dispense an article (e.g., bulk food) upon moving a dispensing handle 26 from a closed position into an open position such that the bulk food flows out of the storage bin 12 via gravity when the dispensing handle is in the open position. In certain examples, an open position may refer to a range of different open positions that allows for a regulation in the flow of the bulk food from the storage bin.

In certain examples, the dispensing handle 26 may include a hand crank that a customer or user is configured to move between the open and closed positions. In alternative examples, the dispensing handle 26 may include an actuator may be configured to move the dispensing handle 26 between the open and closed positions, wherein the customer has provided input via an input device in communication with the actuator to open and close the dispensing handle 26.

The gravity-fed storage bin 12 may also include a display 28 configured to provide information regarding the bulk food or other article/item stored within the storage bin. The information may include the type of bulk food or item being sold, the cost of the item per weight (e.g., $/ounce, $/pound, $/gram, $/kilogram), any advertisement or discount being offered, or a potential/suggested use (e.g., a recipe including the bulk food item).

The display 28 may be a print-out display or sticker that may be adhered to the storage bin. Alternatively, the display 28 may be an electronic display, such as a liquid crystal display (LCD), a light-emitting diode (LED) display, a plasma display, or an electronic-ink display. The advantage of such an electronic display is the configurability to update or change the advertisement or information presented on the display. As such, the system 10 may include a computer or processor in communication with the display 28, such that the processor may provide an update to the information presented on the display 28.

As noted above, the system 10 may include one or more scoop bins 14. A scoop bin 14 may have a lid 30 positioned near a top of the scoop bin and attached to a base 32 of the scoop bin 14 via a hinge or other rotatable element. The lid is configured to be moved between a closed position and an open position. The scoop bin 14 may also include a scoop 34, (e.g., tethered to a section of the scoop bin 14). Bulk food may be scooped out of the scoop bin by a consumer using the scoop when the lid is in the open position.

Similar to the gravity-fed storage bin, the base 32 of the scoop bin 14 may be configured to receive and house an inner container (e.g., bag) containing the bulk food. The container may have an area or section near the top of the container that is configured to be opened after the container has been inserted into the base 32 of the scoop bin 14.

Like the gravity-fed storage bin, the scoop bin 14 may also include a display 28 configured to provide information regarding the bulk food or other article/item stored within the storage bin, as discussed above.

As noted above, the system 10 depicted in FIGS. 10 and 11 also includes a sensor 18, 20 attached to or positioned adjacent to each storage bin 12, 14. The sensors may be configured to monitor a movement of an associated storage bin. The monitored movement of the storage bin may be an opening of the storage bin, a closing of the storage bin, or an opening and subsequent closing of the storage bin.

The sensor may be any type of sensor configured to monitor movement. The sensor may use any number of methods of detecting movement including hall effect, laser, magnetic fields, or other methods of tracking bin usage. This may work by sensing the handle or lid opening on a bin, changes in weight, or volume of product in a bin.

In certain examples, the sensor is a motion sensor such as an infrared sensor, an ultrasonic sensor, a microwave sensor, a tomographic sensor, accelerometer sensor, or a combination thereof. In other examples, the sensor is a magnetic sensor configured to detect a change in a magnetic field (e.g., flux, strength, or duration). In yet other embodiments, the sensor may be a load cell configured to monitor a change in a weight of a respective storage bin.

In certain examples, the sensor may include a plurality of sensor components positioned on one or more parts of a storage bin. For example, a magnetic sensor may have a first component positioned on one part of the storage bin, and a second component positioned on a second part of the storage bin, wherein the first and second components may move adjacent to each other and apart from each other upon the opening and closing of one of the two parts of the storage bin.

Figure 12:
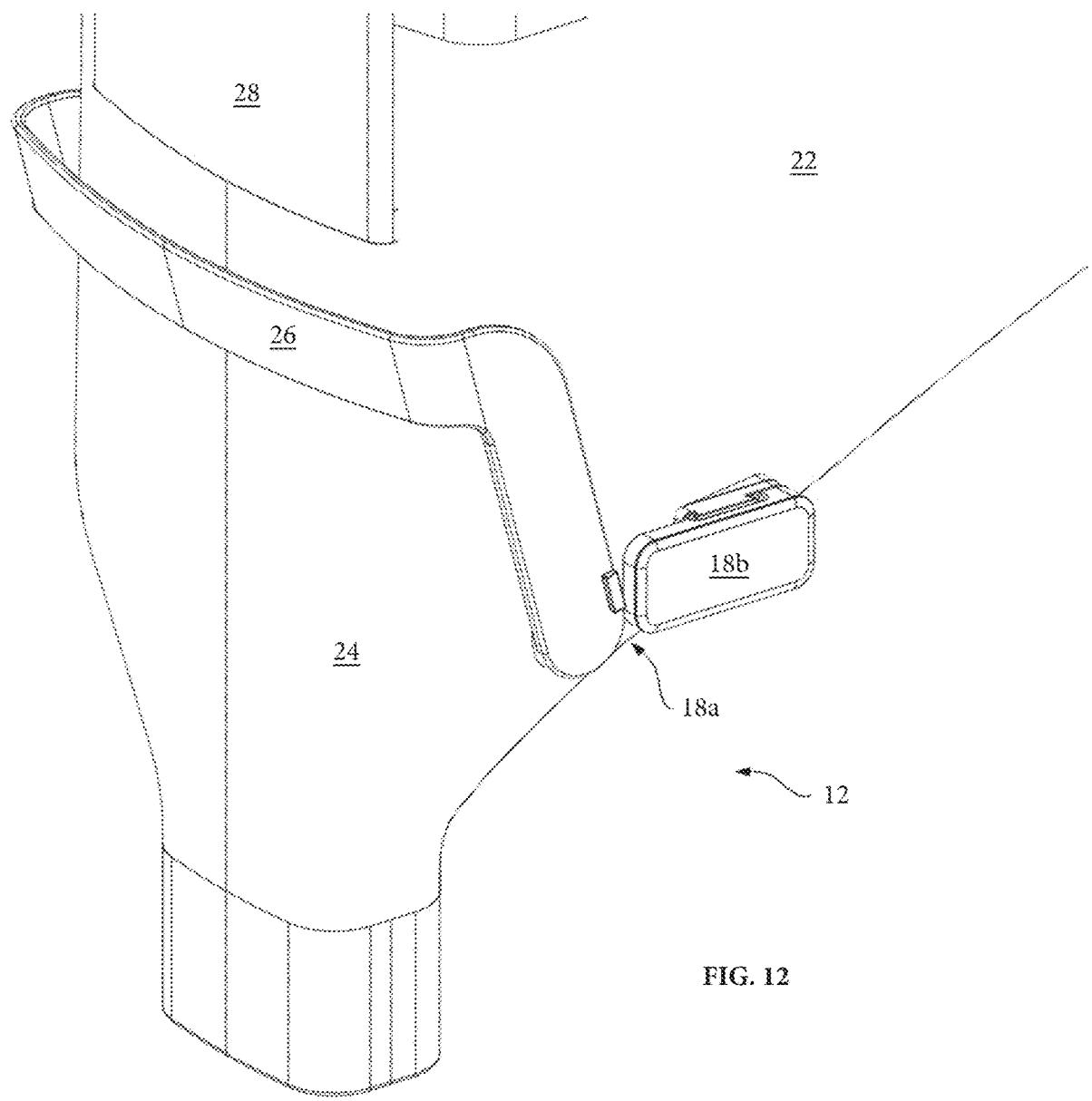
FIG. 12 depicts an angled view of a section of a gravity-fed storage bin. The storage bin includes a dispensing handle (e.g., hand crank) and a sensor positioned near the handle to monitor movement of the handle.

For example, a sensor 18 associated with a gravity-fed storage bin 12 may be positioned on or near a dispensing handle 26 or hand crank of the storage bin. In one particular example, FIG. 12 depicts an angled view of a section of a gravity-fed storage bin identifying the positioning of the sensor adjacent to the dispensing handle 26 to monitor movement of the handle. In the example of FIG. 12, there are two components 18a, 18b to the sensor, such that one component 18a is positioned on the dispensing handle and a second component 18b is positioned adjacent to the dispensing handle. This is advantageous in monitoring a movement between the two components, such that one of the sensor components may transmit a notification or signal to the kiosk or connected computer system when there is change in the positioning between the two components (e.g., when the handle is moved into an open position or a closed position).

Figure 13:
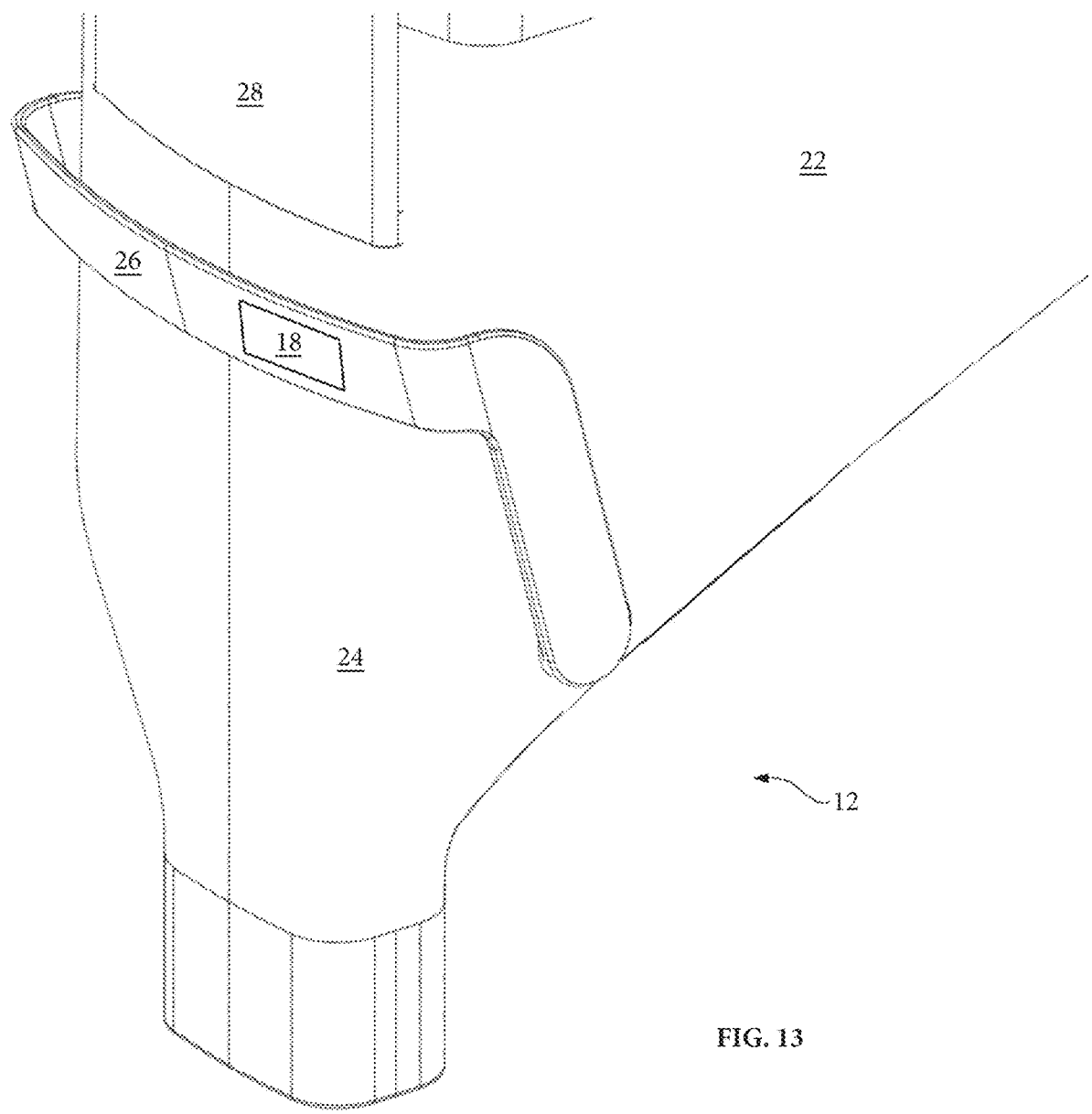
FIG. 13 depicts a section of a gravity-fed storage bin having a dispensing handle and a sensor (e.g., accelerometer) positioned on the handle to monitor movement of the handle.

In an alternative example, FIG. 13 depicts a section of a gravity-fed storage bin identifying the positioning of the sensor 18 on the dispensing handle 26 to monitor movement of the handle. In the example of FIG. 13, the sensor 18 may be an accelerometer configured to identify a change in the positioning or orientation of the handle. This is advantageous in identifying a change from the steady state, closed position of the dispensing handle to a different position (i.e., open position) of the dispensing handle, and a subsequent return to the closed position of the dispensing handle. In certain examples, the sensor 18 may be embedded within the dispensing handle (e.g., a cover may be placed over the sensor), which is advantageous in disguising the electronic component from the consumer.

Figure 14:
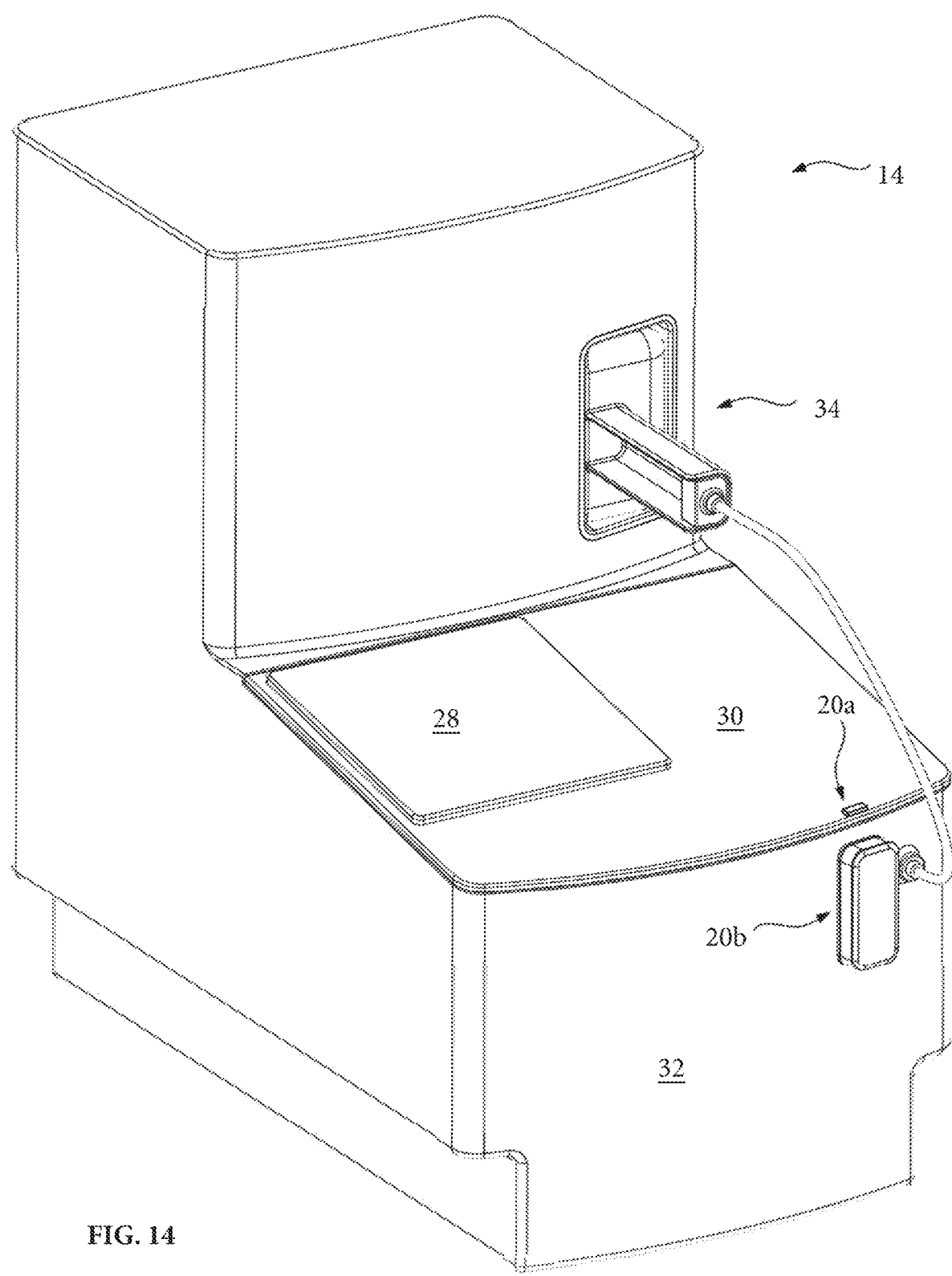
FIG. 14 depicts an angled view of an example of a scoop bin. The scoop bin includes a lid and a sensor positioned near the lid to monitor movement of the lid. The scoop bin also includes a scoop tethered to a section of the scoop bin, wherein the scoop is configured to be used by a customer to scoop out a bulk food or other item from the bin when the lid is in an opened position.

Additionally, for a scoop bin 14, the sensor 20 may be positioned on or near a lid 30 of the scoop bin 14. In one example, FIG. 14 depicts an angled view of an example of a scoop bin having a sensor positioned near the lid to monitor movement of the lid. In the example of FIG. 14, there are two components 20a, 20b to the sensor, such that one component 20a is positioned on the lid 30 and a second component 20b is positioned adjacent to the lid on the base 32 of the scoop bin 14. This is advantageous in monitoring a movement between the two components, such that one of the sensor components may transmit a notification or signal to the kiosk or connected computer system when there is change in the positioning between the two components (e.g., when the lid has been opened or closed).

Figure 15:
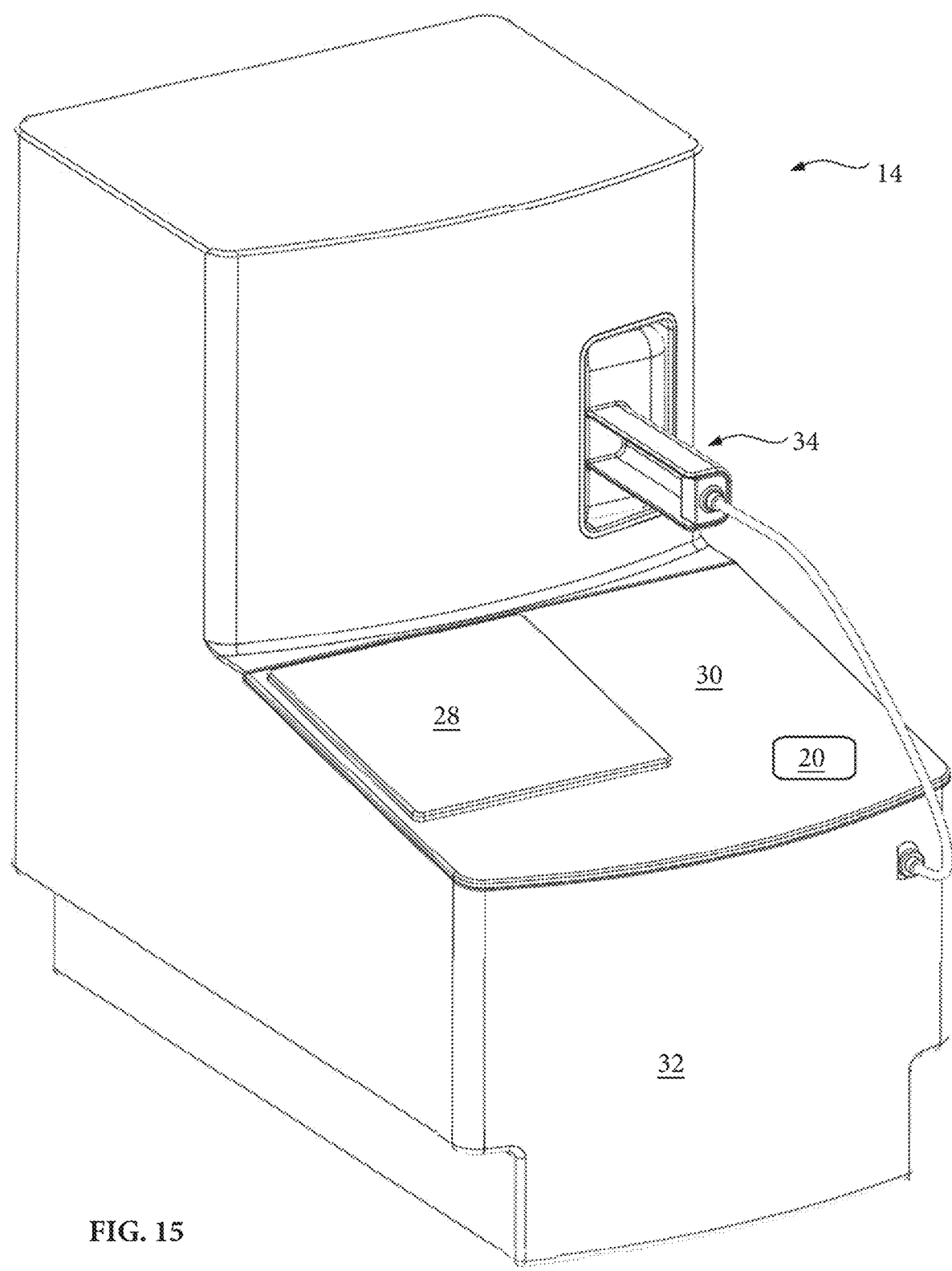
FIG. 15 depicts a section of a scoop bin having a lid and a sensor (e.g., accelerometer) positioned on the lid to monitor movement of the lid.

In an alternative example, FIG. 15 depicts a section of a scoop bin 14 identifying the positioning of the sensor 20 on the lid 30 to monitor movement of the lid. In the example of FIG. 15, the sensor 20 may be an accelerometer configured to identify a change in the positioning or orientation of the lid 30. This is advantageous in identifying a change from the steady state, closed position of the lid to a different position (i.e., open position) of the lid, and a subsequent return to the closed position of the lid. In certain examples, the sensor 20 may be embedded within the lid 30 (e.g., a cover may be placed over the sensor), which is advantageous in disguising the electronic component from the consumer.

In additional alternative examples, the monitored movement of the gravity-fed storage bin 12 or scoop bin 14 may be the change in the weight of the storage bin. As noted above, a load cell may refer to a sensor or type of digital scale, in which a transducer is used to create an electrical signal whose magnitude is directly proportional to the force (e.g., weight) being measured. The load cell may be a resistive or capacitive load cell. Exemplary embodiments of a storage system having a load cell is described in greater detail below.

When the sensor has observed or monitored the specific movement of the storage bin, the sensor may be configured to transmit a notification or signal to a connected computing device of the system (e.g., a kiosk) identifying the movement of the respective storage bin. The transmission of the notification may be immediately upon observing the movement, or may be time-delayed (e.g., 5-10 seconds, 10-20 seconds, etc.) after sensing the movement.

In certain examples, the transmission of the notification or signal identifying the movement may take place when the storage bin has been opened. This may be advantageous in preparing the label or tag (discussed in greater detail below) for the bulk food while the customer is filling out his or her container with the bulk food such that the label is printed and ready to adhere to the container upon completion.

In alternative examples, the transmission of the signal identifying the movement may take place after the storage bin has been closed (or opened and then closed). This may be advantageous in preparing the label or tag for the bulk food after the customer has completed his or her dispensing of the bulk food and not during the dispensing process.

As noted above, the system 10 depicted in FIGS. 10 and 11 includes a kiosk 16 (e.g., a computing device having a processor and memory) configured to receive the signal from the sensor identifying that a storage bin has been opened and/or closed. The kiosk 16 is configured to identify the specific storage bin that has been opened/closed based on the transmitted signal.

The sensors and kiosk may be connected to each other via wired connection (see FIG. 11). Alternatively, the sensors and kiosk may be connected to each other via a wireless connection (see FIG. 10). The wireless connection may be any known or later developed wireless network connection such as a wide area network (WAN) (e.g., cellular), local area network (LAN) (e.g., Wi-Fi or IEEE 802.11), or personal area network (PAN) (e.g., Bluetooth or ANT+).

The kiosk 16 includes a printer 36 configured to automatically print a label identifying the bulk food or article/item identified by the sensor as having been dispensed from a storage bin of the system 10 (e.g., without input from the customer). In other words, after the kiosk has identified a storage bin has been opened/closed, a label may be automatically printed for the customer to adhere to their container for the bulk food retrieved from the identified storage bin.

As noted above, this automatic printing of the label is advantageous in reducing theft or loss of sales in the sale of the bulk food items. In other words, the automatic identification and printing of the label may reduce or eliminate the risk of a customer mislabeling the dispensed good (e.g., with a lower priced bulk food item or with an incorrect, lower weight). Furthermore, by automatically generating a label for the bulk food item, this advantageously may speed up the purchase process for the customer and the store. For example, the customer may spend a shorter amount of time retrieving and labeling the bulk food item at the bulk food dispensing device or system. Additionally, the scanning of the label at checkout may be advantageously faster than a store employee having to look up a code for a bulk food item and weigh the item (e.g., like the checkout of a produce item).

The printer 36 may be any type of label printer such as a thermal transfer printer, an inkjet printer, a laser printer, or a radio-frequency identification printer. The label printer may be configured to print any type of label or receipt that identifies the article (e.g., bulk food item) that has been dispensed or retrieved from a storage bin. The label may be configured to be optically scanned at a checkout counter. For example, the label may include a barcode such as a universal product code (UPC), international article number (IAN) code, or stock keeping unit (SKU) code. Alternatively, the label may a type of matrix barcode such as a quick response (QR) code. In other embodiments, the label or receipt may include a smart label such as a radio-frequency identification (RFID) configured to be scanned or captured via radio waves. In yet other embodiments, the label or receipt may include a printout or alpha-numeric identification for a particular article (e.g., bulk food), which is configured to be entered at checkout. In certain examples, the label may provide a weight, a cost, or both the weight and the cost of a dispensed amount of the bulk food from the opened storage bin based on the change in the weight of the storage bin measured by a load cell.

In certain examples, a label may be printed onto an adhesive paper stock having a removable backing. This is advantageous in allowing the customer to securely adhere the label to their container holding the dispensed bulk food.

The kiosk 16 may also include a display 38 configured to provide information about the bulk food within the storage bin identified by the sensor as having a movement. In certain examples, the display 38 is a touchscreen display allowing a customer to interact with the storage system. The customer may be able to input information on the touchscreen display to request information about a particular bulk food item (e.g., a cost of the item, its origin or source of production, or even a recipe involving the bulk food item).

The kiosk 16 may also include a scale 40 configured to weigh the bulk food or item that has been dispensed. The associated display 38 may be configured to provide a weight, a cost, or both a weight and cost of a dispensed amount of the bulk food from the identified storage bin when placed on the scale.

In summary, the devices or systems for dispensing a bulk food or article from the system 10 discussed above and depicted FIGS. 10-15 allows for a customer to retrieve a container (e.g., bag) or bring their own container or bag and place the container beneath a gravity-fed storage bin or in the vicinity of a scoop bin. The customer may then open a lid of the scoop bin or move a dispensing handle of gravity-fed storage bin to retrieve or dispense the bulk food. When finished, the customer may then close the lid or return the dispensing handle to its closed position. The sensor associated with the scoop bin or gravity-fed storage bin is activated when the storage bin is opened and/or closed, and a signal is sent to the kiosk. The kiosk is configured to identify the specific sensor and the product information associated with the respective storage bin that has been opened/closed by the customer. The kiosk then prints identifying information (e.g., a barcode) onto a label. The customer may then adhere the label to their container and proceed to checkout, wherein the item is scanned (and weighed, in some instances) for payment.

Systems with Real-Time Weight Monitoring

Figure 16:
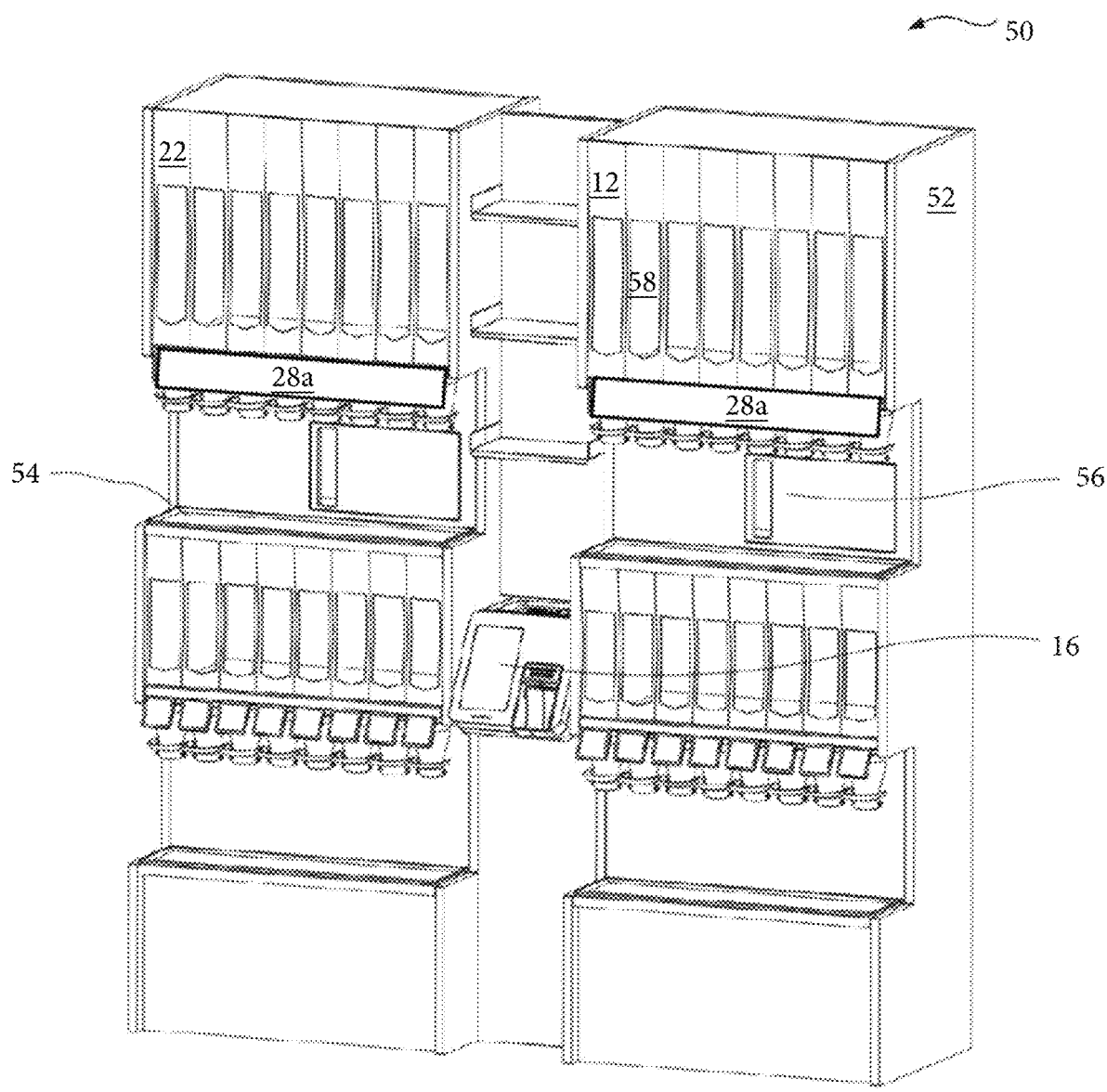
FIG. 16 depicts an angled front view of an example of a bulk food storage system having a plurality of storage bins in a rack-tower layout, with the kiosk and printout station in the middle of the dispenser rows.
Figure 17:
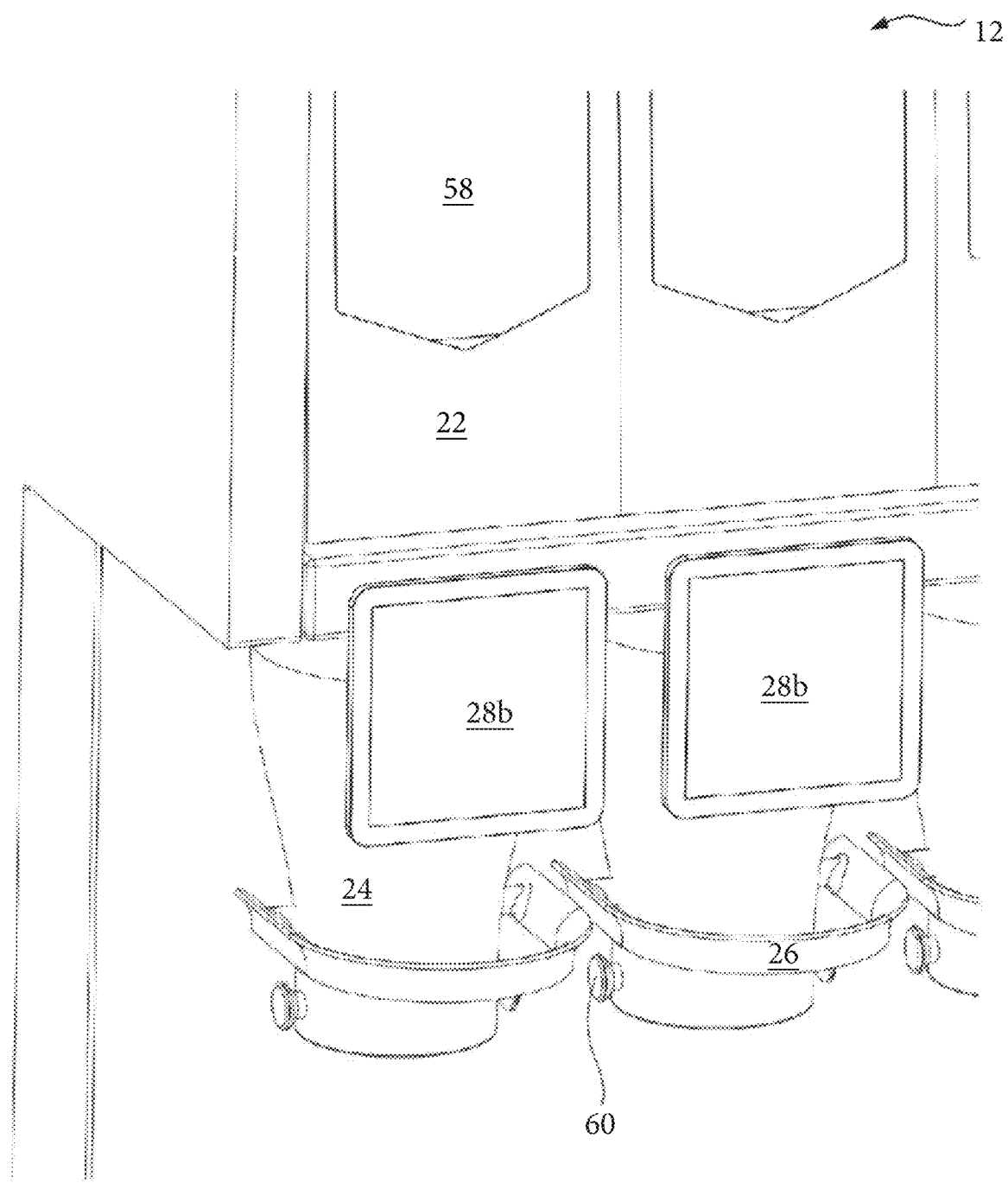
FIG. 17 depicts an example of a close-up view of a section of gravity-fed storage bins having individual displays.
Figure 18:
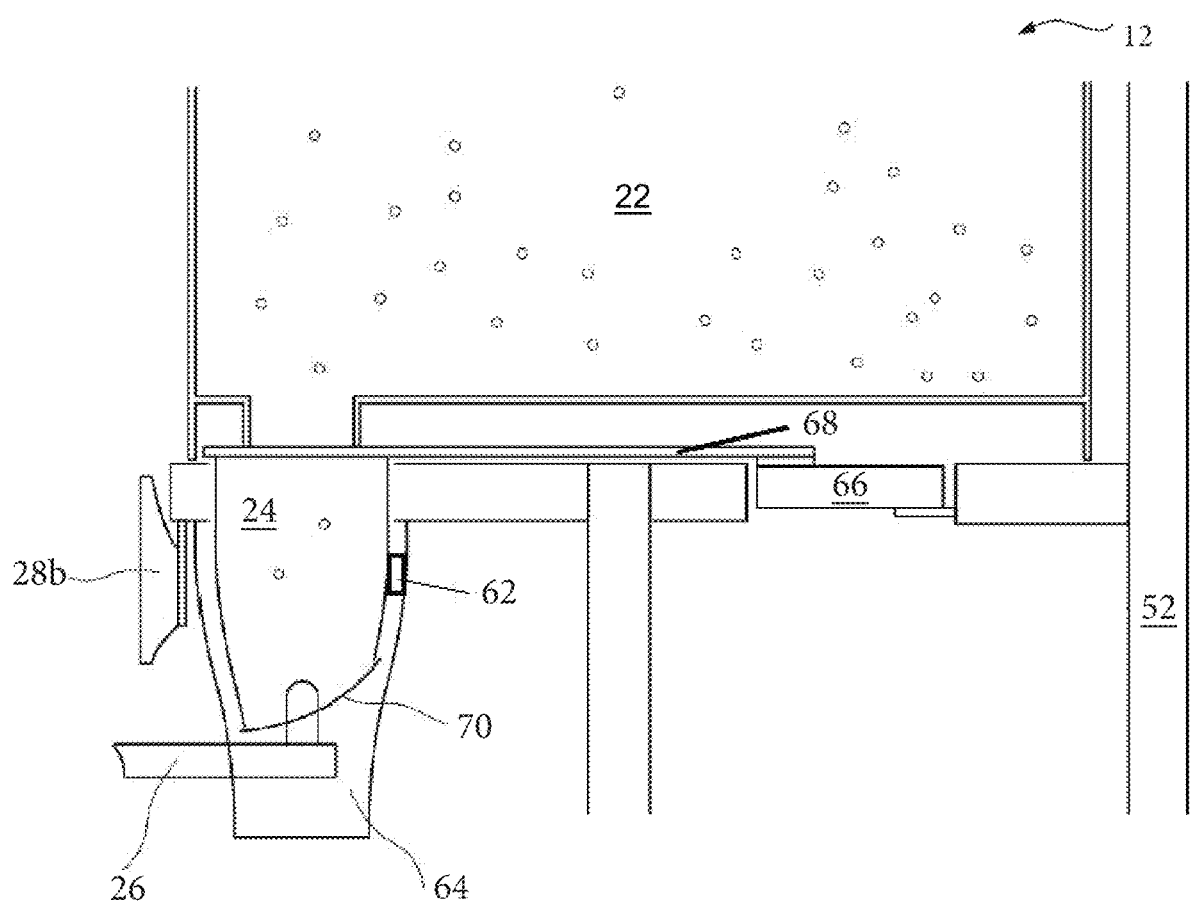
FIG. 18 depicts an example of a side view of a section of a gravity-fed storage bin.

As noted above, a bulk food storage and dispensing system may provide a real-time weight monitoring of a bulk food item being dispensed. FIGS. 16-18 depict an example of such a bulk food storage and dispensing system 50 for real-time weight monitoring. As depicted in FIG. 16, the system 50 includes a plurality of gravity-fed storage bins 12 and at least one central kiosk 16 or customer touchscreen and printout station for a section of storage bins. The storage bins 12 and kiosk 16 may be secured within a housing 52 of the system 50. The housing 52 may include trays 54 positioned beneath a series of gravity-fed storage bins 12 to collect any errant bulk food that is not properly dispensed into a customer's container. The system 50 may also include a section within the housing 52 to store bags 56 to be used by a customer when dispensing a bulk food.

The gravity-fed storage bins 12 may be configured to store and dispense one or more bulk foods. FIGS. 17 and 18 depict an example of a gravity-fed storage bin 12 of the system 50. In these examples, the storage bin 12 may include a hopper 22 configured to store the bulk food. The hopper 22 may include a viewing window 58 allowing a customer or store employee to view the contents of the storage bin 12. As noted above, the hopper 22 may be configured to receive and house an inner container (e.g., bag) containing the bulk food. This is advantageous in removing an empty container, expired bulk food item, or low-selling item with a new full container without contaminating the inner surface of the hopper 22.

The gravity-fed storage bin 12 may also include a chute or reservoir 24 positioned at the base of the hopper 22. The reservoir 24 provides an intermediate location between the hopper 22 and dispensing of the bulk food into a bag or container of a customer. The reservoir 24 may advantageously provide extra storage volume to store the bulk food items. In other words, when the hopper has been emptied, a remaining amount of bulk food may be stored within the reservoir 24. This allows for easy removal and replacement of an inner container in the hopper with little or no bulk food being wasted (i.e., the hopper can be completely emptied prior to replacement because a percentage of the bulk food originally stored in the hopper remains within the reservoir).

The gravity-fed storage bin 12 may also include a dispensing handle 26 positioned near a base of the gravity-fed storage bin 12, wherein the bin is configured to dispense an article (e.g., bulk food) upon moving a dispensing handle 26 from a closed position into an open position such that the bulk food flows out of the storage bin 12 via gravity when the dispensing handle is in the open position.

In certain examples, the dispensing handle 26 may include a hand crank that a customer or user is configured to move between the open and closed positions. In alternative examples, the dispensing handle 26 may include an actuator may be configured to move the dispensing handle 26 between the open and closed positions, wherein the customer has provided input via an input device in communication with the actuator to open and close the dispensing handle 26.

The storage bin 12 may also include at least one hook 60 configured to hold a container or bag beneath the reservoir of the storage bin 12.

The system may also include a display 28a, 28b positioned on or adjacent to one or more storage bins 12. The display 28a, 28b may be configured to provide information regarding the bulk food or other article/item stored within the storage bin. The information may include marketing information for the bulk foods, the type of bulk food or item being sold, the price per weight (e.g., $/ounce, $/pound, $/gram, $/kilogram), any advertisement or discount being offered, or a potential/suggested use (e.g., a recipe including the bulk food item). The display 28a, 28b may also provide instructions on where to retrieve a printed label following the dispensing of the bulk food (which may be particularly advantageous if the system 50 includes a plurality of kiosks).

As depicted in FIG. 16, the display may be a single display screen 28a for a plurality of storage bins. The single display screen 28a be configured to change or rotate between different types of information. For example, in one arrangement, individual information is provided for each storage bin being represented by the display screen 28a. In some examples, the display 28a may change when an item is being dispensed (e.g., when the dispensing handle is moved, and the load cell recognizes a change in the weight of a storage bin). In such an example, only information related to the item being dispensed is displayed on the single display screen 28a. In other words, the information related to the item being dispensed "expands" to cover the entire display screen 28a.

In certain examples, the display 28a, 28b may provide real-time weight and/or cost information during a dispensing of a bulk food. This is advantageous in providing information to a customer seeking to dispense a specific amount of bulk food).

The display 28a, 28b may also provide a countdown clock or timeout period following the dispensing of an amount of bulk food. The countdown clock may be activated when the dispensing handle 26 is closed and the load cell detects no further change in weight of the storage bin housing the bulk food. This countdown clock may be advantageous in providing a warning to a customer to decide if any further bulk food from the specific storage bin should be dispensed prior to a printout of a label identifying the amount and/or cost of the dispensed bulk food. The countdown clock or timeout period may be configured to any length of time. In certain examples, the timeout period is between 1-10 seconds, 5-10 seconds, or 5-7 seconds.

The display 28a, 28b may be an electronic display, such as a liquid crystal display (LCD), a light-emitting diode (LED) display, a plasma display, or an electronic-ink display. The advantage of such an electronic display is the configurability to update or change the advertisement or information presented on the display. As such, the system 50 may include a computer or processor in communication with the display 28a, 28b, such that the processor may provide an update to the information presented on the display 28a, 28b.

The storage bin may also include an agitator 62 configured to shake up any bulk food that may be stuck in the chute or reservoir 24 as the bulk food is being dispensed. The agitator 62 may be any electronic component configured to provide a vibration to dislodge any stuck bulk food.

In the example depicted in FIG. 18, the agitator is positioned on an external surface of the reservoir 24, between the reservoir 24 and an external cover 64 of the storage bin 12. The agitator 62 may be positioned in any location within or on the storage bin that is capable of providing a vibration needed to keep the bulk food flowing through the reservoir and into a customer's bag. In certain examples, the agitator 62 is activated immediately upon an opening of the dispensing handle 26 (i.e., the dispensing handle includes a sensor such as an accelerometer to identify closed and open positions, which is relayed to the agitator via a connected computer). Alternatively, the agitator 62 is activated when the dispensing handle 26 is in an open position and the load cell does not detect a weight change for the storage bin 12. In a further alternative embodiment, the agitator 62 is activated manually by a customer when the customer visually identifies little, or no bulk food being dispensed despite the dispensing handle 26 being in an open position.

As depicted in FIG. 18, the storage and dispensing system 50 includes a load cell sensor 66 for each storage bin 12. The load cell sensor 66 is positioned adjacent to each gravity-fed storage bin 12 and configured to monitor a weight of a respective gravity-fed storage bin. In this particular example, the load cell 66 is positioned beneath a hopper of the storage bin. The hopper and the reservoir of the storage bin are connected to the load cell via a connecting bar 68. This is advantageous in monitoring the weight of the bulk food in both the hopper and the reservoir. A change in weight is identified for bulk food that exits the reservoir into a customer's container or bag (and not when the bulk food exits the hopper and into the reservoir). In this example, the dispensing handle 26 is connected to a gate valve 70 which is separate from the hopper 22 and reservoir 24, and not connected to the connecting bar 68 or the load sensor 66. This is advantageous in avoiding the load sensor 66 from measuring any change in weight when a customer holds onto or moves the dispensing handle 26 (therein eliminating false weight changes).

The load cell sensor 66 may advantageously provide real-time monitoring of a respective storage bin, allowing a customer to know exactly how much of a bulk food is being dispensed as the item is being dispensed (e.g., by being displayed on the display screen in front of the respective storage bin 12).

Each load cell sensor 66 may be configured to transmit a notification or signal to a connected computer (e.g., kiosk) identifying a change in weight of the respective gravity-fed storage bin following a predefined amount of time without any weight change.

In addition to allowing the customer to know how much of a bulk food has been dispensed in real-time, the weight monitoring by the load cell also provides the store and bulk food vendors with real-time sales information.

As such, the storage system 50 may be configured to track sales of individual bulk foods in real-time based on the monitored weights of the respective gravity-fed storage bins. This may be advantageous in providing knowledge to a store owner or a vendor of sales trends of a specific bulk food item based on marketing strategies, listed prices of the bulk foods, times of the year, etc.

The storage system 50 may also be configured to identify a time to replenish or re-stock a gravity-fed storage bin with a bulk food based on the monitored weight of the gravity-fed storage bin. In other words, a storage bin may have a known empty weight. Upon an identification of a weight of the storage bin approaching the empty weight, an alert may be provided to a connected computer of the storage system to identify a time to re-order a supply or re-stock the storage bin with more bulk food.

In other examples, the storage system 50 may also be configured to identify a shelf-life of a bulk food item based upon the most recent re-stocking of a storage bin. For example, a bulk food may have a shelf-life of one month. When a bulk food is added to an empty or near-empty hopper, the load cell sensor identifies the addition of bulk food based on a positive change in the weight of the storage bin. This may trigger a countdown clock within the connected computer system monitoring the bulk food system, which identifies the shelf-life of one month before any remaining bulk food should be discarded. In some examples, to the extent the shelf-life is near expired but bulk food remains present in the storage bin, an alert may be provided to the store owner, operator, or vendor to suggest a reduction in cost or automatically reduce a cost of the particular bulk food to avoid discarding unsold product.

As such, the storage system 50 may be in communication with a vendor or third-party over a communication network such that the vendor may monitor the real-time sales of their particular bulk foods and provide potential updated marketing advertisements or pricing information to be displayed on a display of the system 50.

As depicted in FIG. 16, the system 50 includes at least one kiosk 16 for a plurality of storage bins 12. The kiosk 16 may have similar or different components to the kiosk discussed above with reference to FIGS. 10 and 11. In certain examples, the system 50 may include a plurality of kiosks. In other words, a set number of storage bins may be affiliated with one kiosk, and a separate set of storage bins may be affiliated with a different kiosk. In some examples, to the extent one kiosk of a plurality of kiosks is out of operation (e.g., the printer is out of ink or label material), a transmission from a load cell sensor may be redirected to a separate kiosk of the plurality of kiosks.

The kiosk 16 may be configured to receive the notification from the load cell sensor and automatically print a label with a connected printer. The printer may be any type of label printer such as a thermal transfer printer, an inkjet printer, a laser printer, or a radio-frequency identification printer. The label printer may be configured to print any type of label or receipt that identifies the article (e.g., bulk food item) that has been dispensed or retrieved from a storage bin. The label may be configured to be optically scanned at a checkout counter. For example, the label may include a barcode such as a universal product code (UPC), international article number (IAN) code, or stock keeping unit (SKU) code. Alternatively, the label may a type of matrix barcode such as a quick response (QR) code. In other embodiments, the label or receipt may include a smart label such as a radio-frequency identification (RFID) configured to be scanned or captured via radio waves. In yet other embodiments, the label or receipt may include a printout or alpha-numeric identification for a particular article (e.g., bulk food), which is configured to be entered at checkout. In certain examples, the label may provide a weight, a cost, or both the weight and the cost of a dispensed amount of the bulk food from the opened storage bin based on the change in the weight of the storage bin measured by a load cell.

In certain examples, a label may be printed onto an adhesive paper stock having a removable backing. This is advantageous in allowing the customer to securely adhere the label to their container holding the dispensed bulk food.

The timing for printing the label may be based on a time-out function, as noted above, wherein the label is not printed immediately following the conclusion of a dispensing of bulk food from a storage bin. Instead, there may be a built-in delay (e.g., 1-10 seconds, 5-10 seconds, 5-7 seconds) before the label is printed.

Figure 19:
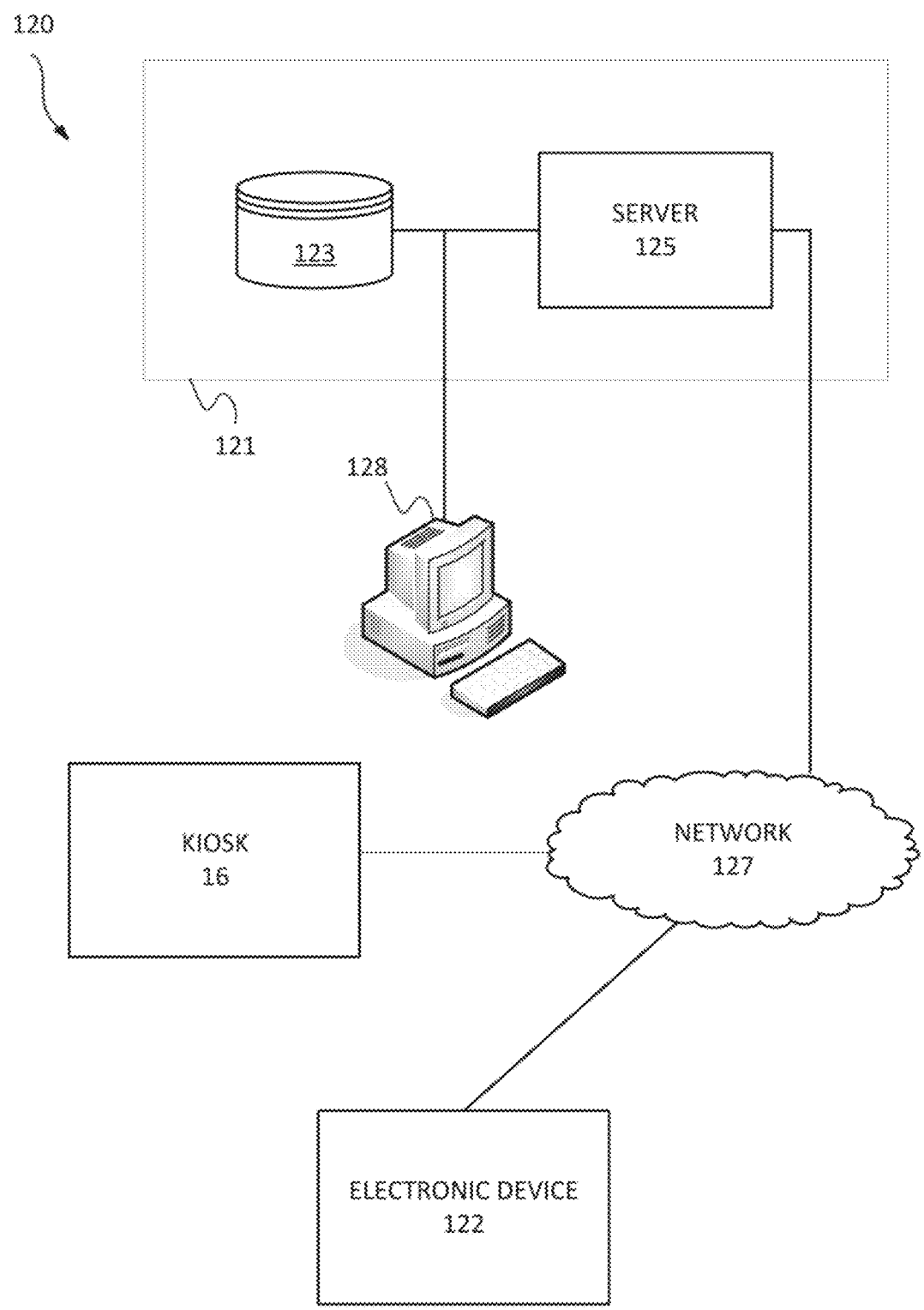
FIG. 19 illustrates an example communication system between a bulk food storage bin system and an electronic device over a connected network.

FIG. 19 illustrates an exemplary system 120 for monitoring/tracking bulk food sales. The system 120 includes a monitoring system 121, at least one electronic device 122, a workstation 128, and a network 127. Additional, different, or fewer components may be provided. For example, the system 120 may include one or more kiosks 16 in addition to the monitoring system 121.

As noted above, the at least one electronic device 122 may be any computing device such as a workstation, a server, a desktop computer, a tablet computer, a notebook computer, a smart phone, or a mobile phone, for example.

In certain examples, the electronic device 122 may be operated by a manager of the bulk food system at a specific location. Alternatively, the electronic device 122 may be operated by a third-party vendor or supplier of one or more bulk foods, wherein the vendor may be able to access information over the connected network 127 to monitor the inventory or sales of the one or more bulk foods being sold at one or more locations being monitored by the system. This is advantageous in that the vendor may be able to have real-time information about when a next shipment of a bulk food may be required at a specific location. Additionally, the vendor may be able to understand which bulk foods are selling fast or slow and adjust sales strategies accordingly. This may include cancelling the shipment of a specific bulk food based on poor sales or requesting an adjustment in price (e.g., a discount) for a poor selling bulk food. In certain examples, the vendor may be able to directly adjust the pricing or provide an updated advertisement (e.g., showing a discount) of a bulk food via the connected network 127, wherein the vendor provides the updated pricing or advertisement to be displayed on a display screen of a bulk food system.

The developer system 121 includes a server 125 and a database 123. The developer system 121 may include computer systems and networks of a system operator (e.g., the operator of the bulk food storage system). The server database 123 may be configured to store information regarding the various bulk food items being sold in the individual storage bins. This information may include historical sales trends, inventories, suppliers, sell-by-dates, and pricing information for each of the bulk foods being sold.

The developer system 121, the workstation 128, and the at least one electronic device 122 are coupled with the network 127. The phrase "coupled with" is defined to mean directly connected to or indirectly connected through one or more intermediate components. Such intermediate components may include hardware and/or software-based components.

The optional workstation 128 may be a general-purpose computer including programming specialized for providing input to the server 125. For example, the workstation 128 may provide settings for the server 125. The settings may include a value for the predetermined interval that the server 125 requests the device 122 to relay current geographic locations. The workstation 128 may be used to enter data indicative of Global Positioning System (GPS) accuracy to the database 123. The workstation 128 may include at least a memory, a processor, and a communication interface.

In certain examples, the workstation 128 may be a kiosk of the bulk food storage system. Alternatively, the workstation 128 may be a central hub computer that is in communication with one or more kiosks of a bulk food storage system.

Figure 20:
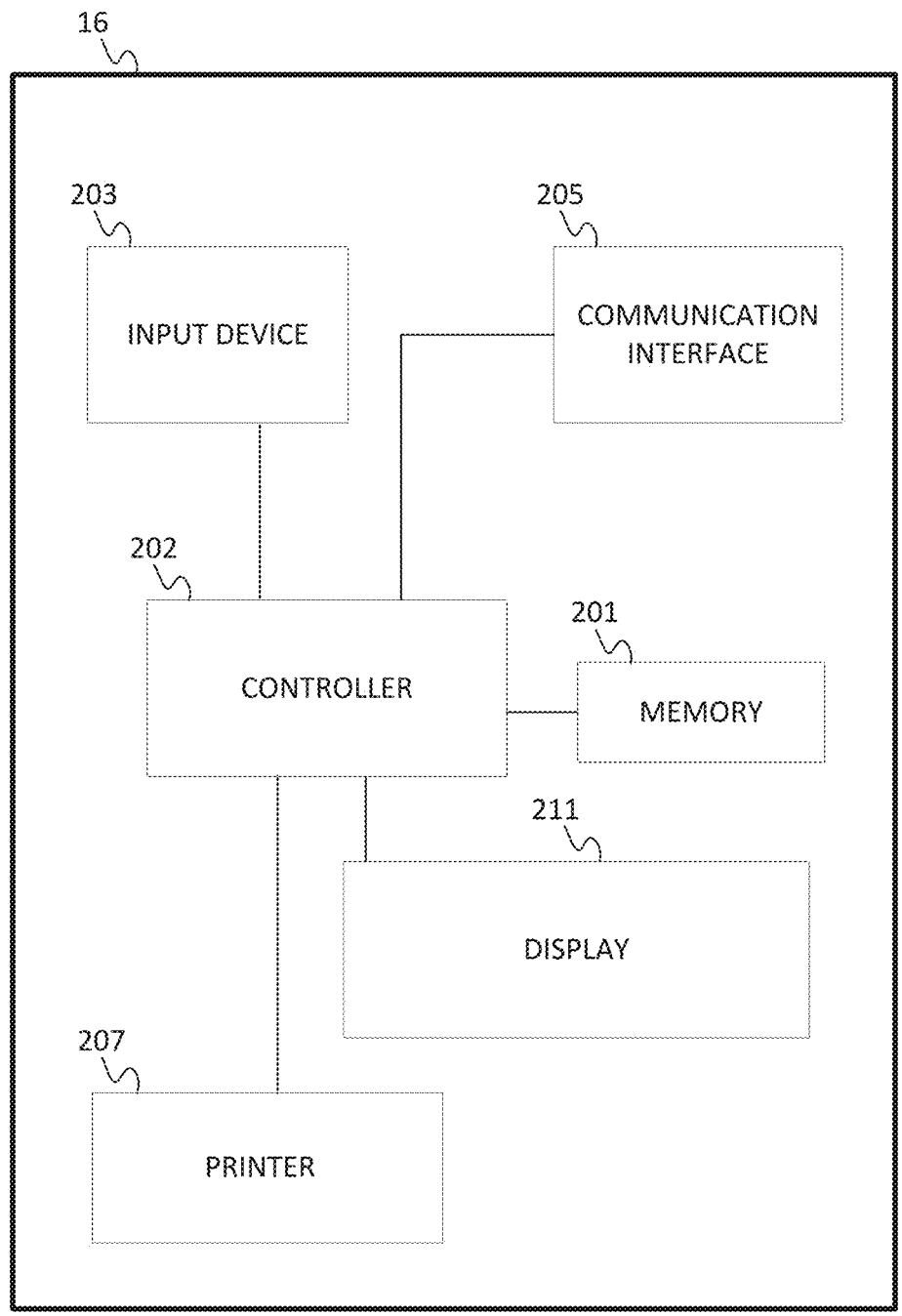
FIG. 20 illustrates an exemplary kiosk or computing device of the system of FIG. 19.

FIG. 20 illustrates an exemplary kiosk 16 of the system of FIG. 19. The kiosk 16 includes a controller 202, a memory 204, an input device 203, a communication interface 205, a printer 207, and a display 211. Additional, different, or fewer components are possible for the kiosk 16. As noted in the examples above, the communication interface 205 may be configured to receive a transmission or signal from a sensor of a storage bin.

The controller 202 is then configured to interpret the transmission to identify which storage bin has had a bulk food item dispensed. The controller 202 may also be configured to interpret from the transmission the weight and/or cost of the bulk food dispensed and provide instructions to the printer 207 to print a label (e.g., a barcode or RFID tag) with the identifying information for the dispensed bulk food (e.g., the weight, cost, and/or description of the dispensed item). In certain examples, the display 211 of the kiosk 16 may be configured to display information regarding the dispensed bulk food, such as the weight, cost, and/or description of the dispensed item. Further, the display 211 may be configured to display additional information related to the dispensed bulk food item, such as suggested recipes or sourcing information of where the bulk food item originated. In some examples, the display 211 may be a touch screen display allowing a consumer to interact with the kiosk to learn more information about a particular bulk food item that has been dispensed.

Figure 21:
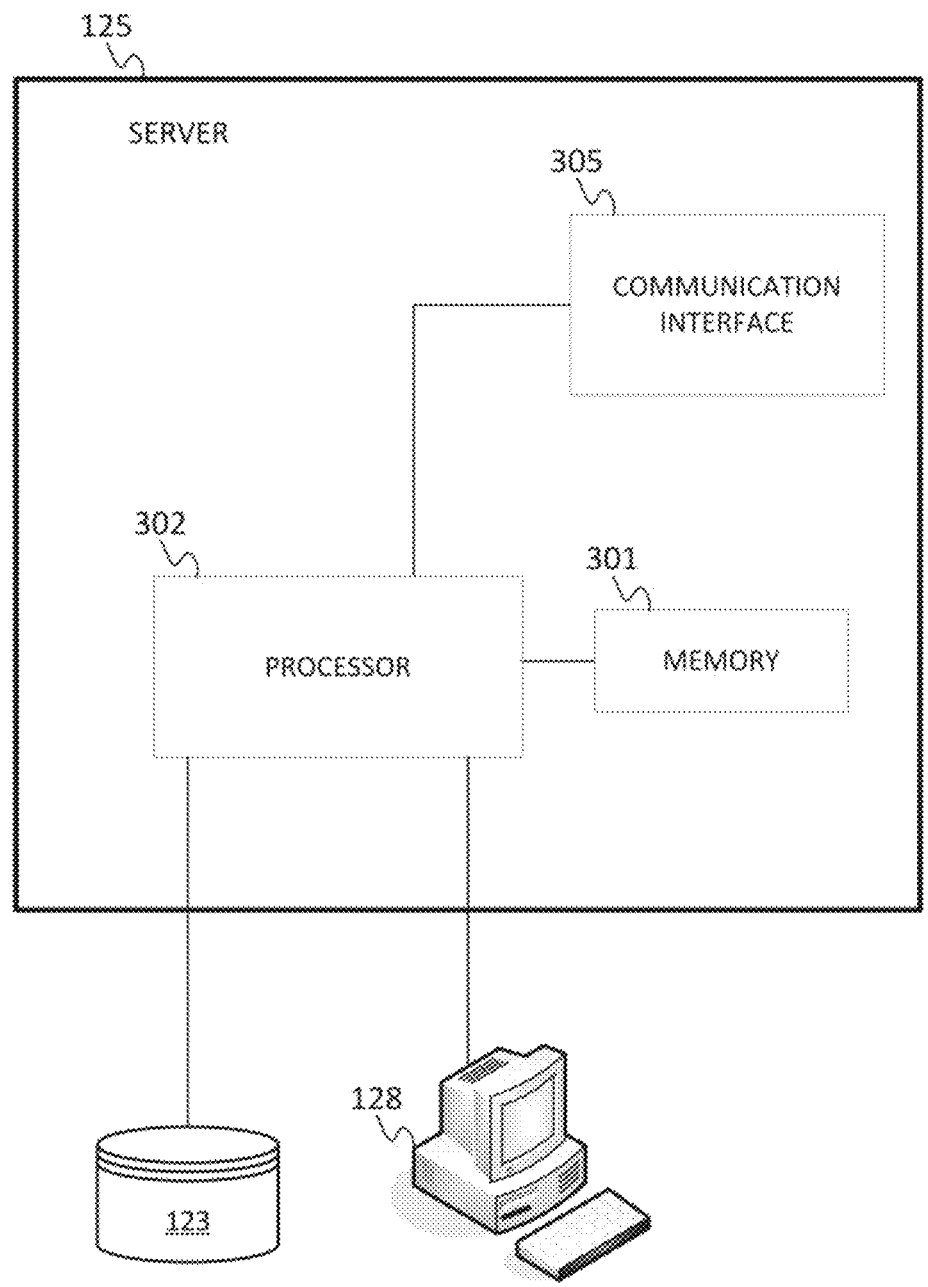
FIG. 21 illustrates an exemplary server of the system of FIG. 19.

FIG. 21 illustrates an exemplary server 125 of the system of FIG. 19. The server 125 includes a memory 301, a processor 302, and a communication interface 305. The server 125 may be coupled to a database 123 and a workstation 128. The workstation 128 may be used as an input device for the server 125. In certain examples, as noted above, the workstation 128 may be a kiosk of the bulk food storage system. In addition, the communication interface 305 is an input device for the server 125. The communication interface 305 receives data indicative of use inputs made via the workstation 128, a separate kiosk 16, or the at least one electronic device 122.

The controller 202 and/or processor 302 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The controller 202 or processor 302 may also be configured to cause an electronic device (e.g., a kiosk) to: (1) receive a transmission or signal from a sensor of a bulk food storage bin; (2) interpret the transmission to identify a specific bulk food that has been dispensed and/or weight or cost information for the amount of bulk food that has been dispensed; and/or (3) provide instructions to a printer 207 to print a label identifying the bulk food dispensed, the amount of bulk food dispensed, and/or the cost of the bulk food dispensed.

The controller 202 or processor 302 may also be configured to cause an apparatus or server to: (1) provide an inventory status (e.g., a weight amount remaining or a percentage remaining) of a bulk food in storage bin of a bulk food storage system to an electronic device; (2) receive an transmission (e.g., instruction) from the electronic device containing an updated advertisement or an updated price (e.g., $/weight) of the bulk food; and (3) transmit the updated advertisement or updated price to a display positioned on or adjacent to a storage bin of the storage system containing the bulk food.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

In the above-described examples, the network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting example, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative example, dedicated hardware implementations, such as application specific integrated circuits, programmable logic arrays and other hardware devices, can be constructed to implement one or more of the methods described herein. Applications that may include the apparatus and systems of various examples can broadly include a variety of electronic and computer systems. One or more examples described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

Although the present specification describes components and functions that may be implemented in particular embodiments with reference to particular standards and protocols, the claim scope is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube), LCD (liquid crystal display), or LED (light emitting diode) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the disclosure. The claims should not be read as limited to the described order or elements unless stated to that effect. Therefore, all embodiments that come within the scope and spirit of the following claims and equivalents thereto are claimed as the disclosure.

The invention claimed is:

1. A storage system comprising:
   a scoop bin configured to store a product, wherein the scoop bin has a lid configured to be moved between a closed position and an open position, and wherein the product is configured to be scooped out of the scoop bin by a customer when the lid is in the open position;
   a computing device; and
   a sensor positioned on the lid of the scoop bin, wherein the sensor is configured to monitor a movement of the scoop bin, wherein the sensor is configured to transmit a notification to the computing device identifying the movement of the scoop bin, and wherein the movement is an opening of the scoop bin, a closing of the scoop bin, or an opening and subsequent closing of the scoop bin,
   wherein a printer is configured to receive an instruction from the computing device to automatically print a label identifying the product stored in the scoop bin following the computing device receiving the notification of the movement of the scoop bin.

2. The storage system of claim 1, further comprising:
   a scale configured to monitor a change in a weight of the scoop bin.

3. The storage system of claim 2, wherein the scale comprises a load cell.

4. The storage system of claim 1, wherein the sensor is an accelerometer sensor.

5. The storage system of claim 1, wherein the sensor is fully positioned on an inner surface of the lid.

6. The storage system of claim 1, wherein the product is a food item.

7. The storage system of claim 1, further comprising:
   a display configured to provide information about the product within the scoop bin upon identification by the sensor of the movement of the scoop bin.

8. The storage system of claim 7, further comprising:
   a scale,
   wherein the display is further configured to provide a weight, a cost, or both the weight and the cost of a dispensed amount of the product from the scoop bin when the dispensed amount of the product is placed on the scale.

9. The storage system of claim 1, further comprising:
   a scale; and
   a display configured to provide a weight, a cost, or both the weight and the cost of a dispensed amount of the product from the scoop bin when the dispensed amount of the product is placed on the scale.

10. The storage system of claim 1, wherein the label is a barcode or a radio-frequency identification (RFID) tag.

11. A storage system comprising:
    a gravity-fed storage bin configured to store a product, wherein the gravity-fed storage bin has a dispensing handle configured to be moved between a closed position and an open position, wherein the product is configured to flow out of the gravity-fed storage bin by gravity when the dispensing handle is in the open position;
    a computing device; and
    an accelerometer sensor positioned on the dispensing handle of the gravity-fed storage bin, wherein the accelerometer sensor is configured to monitor a movement of the gravity-fed storage bin, wherein the accelerometer sensor is configured to transmit a notification to the computing device identifying the movement of the gravity-fed storage bin, and wherein the movement is an opening of the gravity-fed storage bin, a closing of the gravity-fed storage bin, or an opening and subsequent closing of the gravity-fed storage bin, wherein a printer is configured to receive an instruction from the computing device to automatically print a label identifying the product stored in the gravity-fed storage bin following the computing device receiving the notification of the movement of the gravity-fed storage bin.

12. The storage system of claim 11, further comprising: a scale configured to monitor a change in a weight of the gravity-fed storage bin.

13. The storage system of claim 12, wherein the scale comprises a load cell.

14. The storage system of claim 11, wherein the product is a food item.

15. The storage system of claim 11, further comprising:
a display configured to provide information about the product within the gravity-fed storage bin upon identification by the accelerometer sensor of the movement of the gravity-fed storage bin.

16. The storage system of claim 15, further comprising:
a scale,
wherein the display is further configured to provide a weight, a cost, or both the weight and the cost of a dispensed amount of the product from the gravity-fed storage bin when the dispensed amount of the product is placed on the scale.

17. The storage system of claim 11, further comprising:
a scale; and
a display configured to provide a weight, a cost, or both the weight and the cost of a dispensed amount of the product from the gravity-fed storage bin when the dispensed amount of the product is placed on the scale.

18. The storage system of claim 11, wherein the label is a barcode or a radio-frequency identification (RFID) tag.

* * * * *